US012269489B2

(12) United States Patent
Laws et al.

(10) Patent No.: US 12,269,489 B2
(45) Date of Patent: Apr. 8, 2025

(54) FAILOVER HANDLING IN AUTONOMOUS VEHICLES

(71) Applicant: GM Cruise Holdings LLC, San Francisco, CA (US)

(72) Inventors: Shad Laws, Redwood City, CA (US); Spyros Maniatopoulos, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 304 days.

(21) Appl. No.: 18/149,888

(22) Filed: Jan. 4, 2023

(65) Prior Publication Data

US 2024/0217529 A1 Jul. 4, 2024

(51) Int. Cl.
*B60W 50/00* (2006.01)
*B60W 50/02* (2012.01)
*B60W 50/023* (2012.01)
*B60W 60/00* (2020.01)

(52) U.S. Cl.
CPC ...... *B60W 50/023* (2013.01); *B60W 50/0205* (2013.01); *B60W 50/0225* (2013.01); *B60W 60/001* (2020.02)

(58) Field of Classification Search
CPC ........... B60W 50/023; B60W 50/0205; B60W 50/0225; B60W 60/001
See application file for complete search history.

(56) References Cited

U.S. PATENT DOCUMENTS 10,302,441 B2 * 5/2019 Bravo ................. G08G 1/0965

* cited by examiner

*Primary Examiner* — Ian Jen

(57) ABSTRACT

Systems and methods for failover handling at a vehicle in response to a degraded state of operation are provided. For example, a method includes receiving, from a fallback vehicle path planner of a vehicle, data indicative of a fallback path; storing, at a memory of the vehicle, the data indicative of the fallback path; receiving, from a primary vehicle path planner of the vehicle, data indicative of a primary path; receiving an event trigger indicative of a degraded operating condition associated with the primary vehicle path planner; selecting, in response to the event trigger, the fallback path over the primary path; and sending, to a control system of the vehicle in response to the selecting, the stored data indicative of the fallback path.

20 Claims, 12 Drawing Sheets

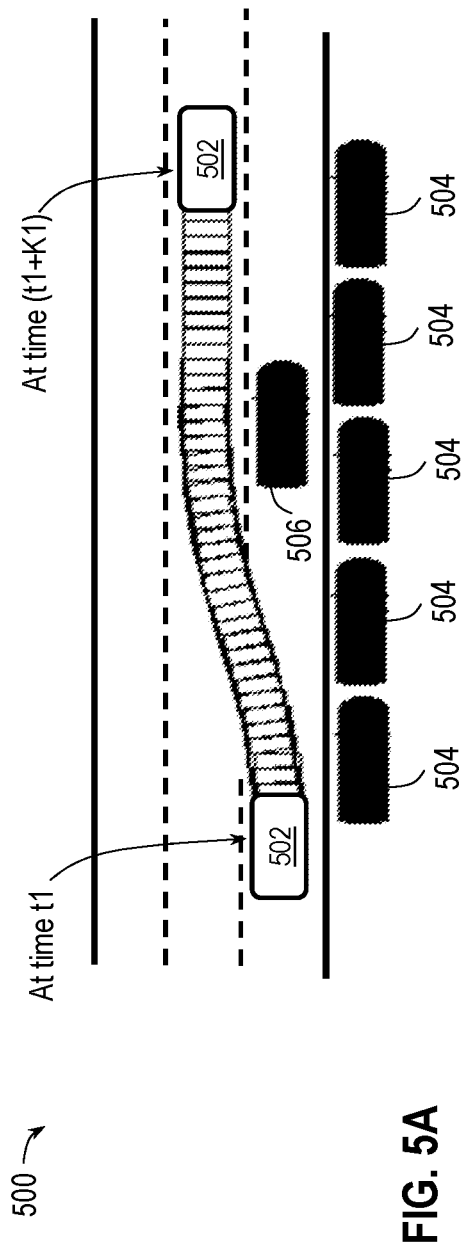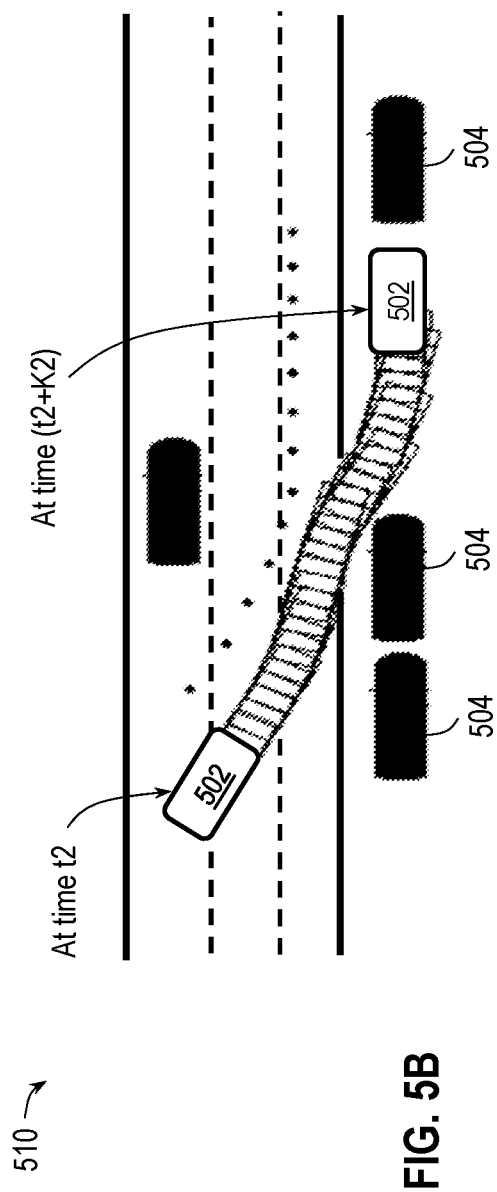
FIG. 5A
FIG. 5B

FAILOVER HANDLING IN AUTONOMOUS VEHICLES

BACKGROUND

1. Technical Field

The present disclosure generally relates to autonomous vehicles and, more specifically, to failover handling in response to a degraded state of operation of a vehicle (e.g., an autonomous vehicle).

2. Introduction

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which:

FIG. 5A illustrates an exemplary scenario in which a fallback compute stack of an AV takes control of the AV, according to some embodiments of the present disclosure;

FIG. 5B illustrates an exemplary scenario in which a fallback compute stack of an AV takes control of the AV, according to some embodiments of the present disclosure;

DETAILED DESCRIPTION

Figure 1:
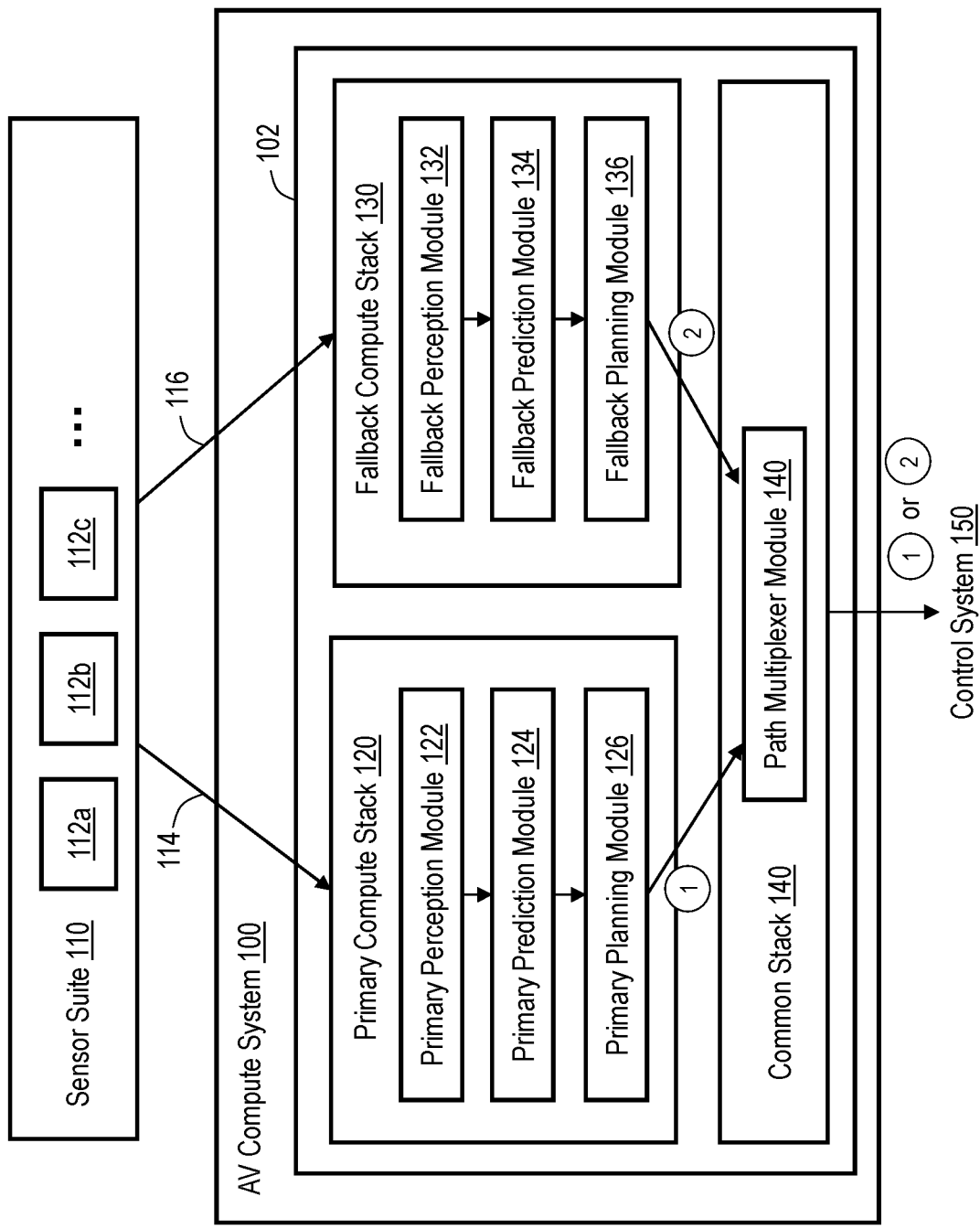
FIG. 1 is a block diagram illustrating an exemplary autonomous vehicle (AV) compute system that provisions for fallback path planning in response to a degraded state of operation, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Autonomous vehicles (AVs) can provide many benefits. For instance, AVs may have the potential to transform urban living by offering opportunities for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

While an AV (or the AV compute system) may collect sensor data generated by its onboard sensors (e.g., cameras, light detection and ranging (LIDAR) sensors, radio detection and ranging (RADAR) sensors, etc.) and monitor a driving environment of the AV based on the sensor data, one or more of these sensors may fail at some point of time. For instance, the AV may rely on images provided by camera(s) for object and/or traffic event classification but the camera(s) may stop to operate (e.g., due to sensor hardware and/or software errors, bad lightings, bad weather conditions, etc.). Further, there may be corner cases that the perception, prediction, and/or planning algorithms implemented by the AV may not detect or unable to handle. For example, machine learning algorithms are commonly used for perception, prediction, and/or planning that facilitates an AV in make driving decisions. While machine learning algorithms can be used to determine a perception, a prediction, and/or a plan that may otherwise be difficult to interpret or solve using numerical analysis alone, the machine learning algorithms may rely heavily on the training data sets that were used to train the machine learning models (e.g., in performing perception, prediction, and/or control). The performance of perception, prediction, and/or planning using machine learning models may thus rely on the coverage of the training data sets in capturing real-world driving scenarios. In general, there may be scenarios where the AV is unable to respond (e.g., unable to calculate a path or make a driving decision). While the AV may request for remote assistance (e.g., from a human operator), there may be delays in obtaining response(s) from remote assistance. Further, in some instances, the AV may be unable to access remote assistance (e.g., due to a weak wireless communication link or being out of a wireless communication coverage area). Accordingly, it may be desirable to have fallback controls built into an AV to handle erroneous and/or faulty events independent of remote assistance. Further, it may be desirable to reduce a reaction time in responding to an erroneous event (or a degraded operating condition). In some examples, a safety standard (e.g., the international organization for standardization (ISO) 26262) may specify requirements for reaction (or response) time to a faulty event.

The present disclosure describes mechanisms for a vehicle (e.g., an AV) to failover to a fallback planner in response to a degraded state of operation with a reduced reaction time. The present disclosure may use the terms "primary vehicle path planner" and "primary planner" interchangeably and may use the terms "fallback vehicle path planner" and "fallback planner" interchangeably.

In an aspect of the present disclosure, a vehicle (e.g., an AV) may include a fallback manager, a primary vehicle path planner, a fallback vehicle path planner, and a path multiplexer, which each may be implemented using any suitable combination of hardware and/or software. The primary vehicle path planner and the fallback vehicle path planner may each periodically calculate a path for maneuvering (or controlling) the vehicle and provide the respective calculated path to the path multiplexer. The primary vehicle path planner and the fallback vehicle path planner may calculate respective paths independently (e.g., using different algorithms and/or sensor data from different sensors or from sensors of different sensing modalities). The path multiplexer may select between a path calculated by the primary vehicle path planner or a path calculated by the fallback vehicle path planner for maneuvering the vehicle. The fallback manager may monitor for a degraded operating condition (e.g., when the primary vehicle path planner can no longer provide a reference trajectory for the vehicle). Under normal (nominal) operations, the path multiplexer may select the path (e.g., a primary path or a non-fallback path) calculated by the primary vehicle path planner for maneuvering the vehicle. However, when the vehicle operations enter a certain degraded operational state (or a certain level of degradation), the fallback manager may trigger the path multiplexer (e.g., by sending an event trigger) to select the path (e.g., a fallback path) calculated by the fallback vehicle path planner for maneuvering the vehicle.

To reduce a reaction (or response time) to a degraded operational state, the failover to the fallback vehicle path planner may be event driven and the path multiplexer may use a last known fallback path received from the fallback vehicle path planner to control the vehicle. In this regard, upon receiving data indicative of a fallback path from the fallback vehicle path planner, the path multiplexer may store the received data to a memory of the vehicle. Upon detecting a degraded operating condition at the fallback manager, the fallback manager may send an event trigger indicating the degraded operating condition to the path multiplexer. In response to receiving the event trigger, the path multiplexer may select the fallback path over the primary path. Based on the selecting, the path multiplexer may read the stored data indicative of the fallback path (e.g., a last known fallback path) from the memory and send the read data (indicative of the fallback path) to a control system of the vehicle (for maneuvering the vehicle according to the fallback path).

In some aspects, the fallback path may include at least one waypoint that is not in the primary path. In some aspects, the at least one waypoint in the fallback path is associated with stopping the vehicle at a comfortable deceleration speed and safely. For instance, the fallback vehicle path planner may be configured to calculate a path that can bring the vehicle to a stop at a suitable location (e.g., out of an intersection or out of a lane with oncoming traffic).

In general, the primary vehicle path planner and the fallback vehicle path planner may operate asynchronously and independently of each other. Accordingly, in some aspects, the path multiplexer may receive the data indicative of the fallback path according to a first path update rate (e.g., a frequency at which the fallback vehicle path planner calculates or update a vehicle path) and may receive the data indicative of the primary path according to a second path update rate (e.g., a frequency at which the primary vehicle path planner calculates or update a vehicle path). The first path update rate used by the fallback vehicle path planner can be independent of and/or different from the second path update rate used by the primary vehicle path planner. In some further aspects, the path multiplexer may receive the data indicative of the fallback path according to a first periodic time interval and may receive the data indicative of the primary path according to a second periodic time interval offset from the first periodic time interval. In some aspects, the fallback manager may also send an event trigger indicating the degraded operating condition to the fallback vehicle path planner upon detecting the degraded operating condition.

In some aspects, the path multiplexer may send, to the control system, the read data indicative of the fallback path may be based on a duration between a time when the data indicative of the fallback path is received and a time when the event trigger is received being less than a threshold. In some instances, the path multiplexer may utilize an aging timer to determine whether the last known fallback path (e.g., the data indicative of the fallback path) is valid (or not stale) at the time when the event trigger is received. This can avoid having the path multiplexer to select an invalid or staled path.

In some aspects, the path multiplexer may track a state variable to determine whether an event trigger for a degraded operating condition has previously been received or whether the vehicle has resumed its operations to normal operations. To that end, the path multiplexer may update a state variable (e.g., internal to the path multiplexer) from a first state to a second state responsive to the received event trigger. For instance, subsequent to receiving the event trigger, the path multiplexer may receive data indicative of another fallback path from the fallback vehicle path planner and may send the data indicative of the other fallback path to the control system based on the state variable being updated to the second state.

In some aspects, the path multiplexer may send, to the primary vehicle path planner in response to the event trigger, an indication indicating that the primary vehicle path planner is not in control of the vehicle. In some aspects, the path multiplexer may send, to the fallback vehicle path planner in response to the event trigger, an indication indicating that the fallback planner is in control of the vehicle. Notifying each of the primary vehicle path planner and the fallback vehicle path planner whether they are in control of the vehicle can allow the primary vehicle path planner and the fallback vehicle path planner to seed their path calculation accordingly. Seeding a path calculation may refer to setting up initial condition(s) (e.g., a location of the vehicle) for the calculation of the path or trajectory. For instance, if a planner is not in control of the vehicle, it may be desirable for the planner to seed its path calculation from an actual current position of the vehicle (e.g., obtained from location sensors at the vehicle). On the other hand, if a planner is in control of the vehicle, the planner can seed its path calculation from a virtual position of the vehicle (e.g., based on a previous path calculation).

In some aspects, when the path multiplexer sends path data to the control system, the path multiplexer may include a (calculation) source of the path along with the path data. For instance, the path multiplexer may send, to the control system, a first message including the data indicative of the fallback path and an indication indicating that a source of the fallback path is the fallback planner. In a similar way, under a normal operating condition, the path multiplexer may also send a source of a primary path when sending data indicative of the primary path to the control system. In this way, the control system may report different diagnostic faults depending on the source of the path (e.g., whether the primary vehicle path planner or the fallback vehicle path planner is in control of the vehicle).

The systems, schemes, and mechanisms described herein can advantageously reduce a reaction time of a vehicle upon detecting a faulty condition. For example, utilizing event driven mechanisms to notify a path multiplexer and/or a fallback vehicle path planner of a degraded operating condition can allow for a reduction in reaction time (e.g., where the event trigger can be sent at any time without having to adhere to a certain operating frequency). Additionally, utilizing a last known (e.g., stored) fallback path to control the vehicle in response to an event trigger indicative of a degraded operating condition can allow the vehicle to switch control to the fallback vehicle path planner (e.g., immediately or as soon as possible) instead of waiting for a next fallback path from the fallback planner. Further, calculating a new fallback path at a fallback vehicle path planner in response to an event trigger indicating a degraded operating condition can allow for a corrective action to be applied to the vehicle at an earlier time instead of waiting for a next fallback path from the fallback planner.

FIG. 1 is a block diagram illustrating an exemplary AV compute system 100 that provisions for fallback path planning in response to a degraded state of operation, according to some embodiments of the present disclosure. The AV compute system 100 may be a computing system located at an AV (e.g., the AV 502 of FIGS. 5A-5B, 6, and 7A-7D or the AV 1002 of FIG. 10). In some examples, the AV compute system 100 may be similar to the local computing device 1010 of FIG. 10. In some examples, the AV compute system 100 may be similar to the system 1100 of FIG. 11. The AV compute system 100 may include memory and processor(s) (e.g., central processing unit(s)(CPUs), GPU(s), DSP(s), ASIP(s), machine learning engines, etc.). The memory may store instruction codes of an AV software 102, when executed by the processor(s) may cause the processor(s) to perform operations of perception, prediction, planning, and/or control. To that end, the AV may further include onboard sensors (e.g., the sensor suite 110) that can sense an environment surrounding the AV. The sensor suite 110 may provide the collected sensor data to the AV compute system 100. The AV software 102 may process the sensor data to determine a perception, a prediction, a planning, and/or a control decision for navigating or maneuvering the AV.

At a high level, the AV software 102 may include a primary compute stack 120, a fallback compute stack 130, and a common stack 140. Each of the primary compute stack 120 and the fallback compute stack 130 may calculate a path (for controlling or maneuvering the AV) and provide the respective calculated path to the common stack 140, or more specifically to a path multiplexer module 142 at the common stack 140. Under a normal (or nominal) operating condition, the path multiplexer module 142 may select the path calculated by the primary compute stack 120. However, if the operations of the primary compute stack 120 is degraded to a certain level or state (e.g., unable to calculate a valid path), the path multiplexer module 142 may switch to select the path calculated by the fallback compute stack 130. Stated differently, the fallback compute stack 130 may operate in a standby mode (e.g., without controlling the AV) under a normal operational condition and may take over the control of the AV under a degraded operating condition. In some aspects, the operational degradations can be classified into several levels of different severities, and the fallback compute stack 140 may take over the control of the AV under a certain level of degradation of operations.

As shown in FIG. 1, the sensor suite 110 may generate sensor data and the AV compute system 100 may receive the sensor data. More specifically, the sensor suite 110 may provide first sensor data 114 to the primary compute stack 120 and may provide second sensor data 116 to the fallback compute stack 130. For instance, the sensor suite 110 may include a variety of sensors, which may broadly categorize into a computer vision ("CV") system, localization sensors, and driving sensors. In particular, the sensor suite 110 may include one or more vision sensors 112a (e.g., camera sensors). The one or more vision sensors 112a may capture images of the surrounding environment of the AV. For instance, the one or more vision sensors 112a may capture images of various objects such as trees, road signs, the traffic lights, buildings, objects, etc. in an environment of the AV. In some instances, the sensor suite 110 may include multiple vision sensors 112a to capture different views, e.g., a front-facing camera, a back-facing camera, and side-facing cameras. In some instances, one or more vision sensors may be implemented using a high-resolution imager with a fixed mounting and field of view. One or more vision sensors 112a may have adjustable field of views and/or adjustable zooms. In some embodiments, the vision sensors 112a may capture images continually or at some intervals during operation of the AV. The vision sensors 112a may transmit the captured images (as part of first sensor data 114) to the primary compute stack 120 for further processing, for example, to assist the AV 102 in determining certain action(s) to be carried out by the AV.

Additionally or alternatively, the sensor suite 110 may include one or more LIDAR sensors 112b. The one or more LIDAR sensors 112b may measure distances to objects in the vicinity of the AV using reflected laser light. The one or more LIDAR sensors 112b may include a scanning LIDAR that provides a point cloud of the region scanned. The one or more LIDAR sensors 112b may have a fixed field of view or a dynamically configurable field of view. The one or more LIDAR sensors 112b may produce a point cloud (e.g., a collection of data points in a 3D space) that describes the shape, contour, and/or various characteristics of one or more object in the surrounding of the AV and a distance of the object away from the AV. For instance, the point cloud may include data points representing various objects such as trees, road signs, the traffic lights, buildings, objects, etc. in an environment of the AV. The one or more LIDAR sensors 112b may transmit the captured point cloud (as part of first sensor data 114) to the primary compute stack 120 for further processing, for example, to assist the AV in determining certain action(s) to be carried out by the AV.

Additionally or alternatively, the sensor suite 110 may include one or more RADAR sensors 112c. RADAR sensors 112c may operate in substantially the same way as LIDAR sensors 112b, but instead of the light waves used in LIDAR sensors, RADAR sensors use radio waves (e.g., at frequencies of 14, 74, 77, and 79 gigahertz (GHz)). The one or more RADAR sensors 112c may transmit the captured RADAR data (as part of first sensor data 114) to the primary compute stack 120 for further processing. For example, the time taken by the radio waves to return from the objects or obstacles to the AV is used for calculating the distance, angle, and velocity of the obstacle in the surroundings of the AV.

Additionally or alternatively, the sensor suite 110 may include one or more location sensors. The one or more location sensors may collect data that is used to determine a current location of the AV. The location sensors may include a global positioning system (GPS) sensor and one or more inertial measurement units (IMUs). The one or more location sensors may further include a processing unit (e.g., a component of an onboard computer of the AV, or a separate processing unit) that receives signals (e.g., GPS data and IMU data) to determine the current location of the AV. The location determined by the one or more location sensors can be used for route and maneuver planning. The location may also be used to determine when to capture images of a certain object. The location sensor may transmit the determined location information to the primary compute stack 120 for further processing, for example, to assist the AV in determining certain action(s) to be carried out by the AV.

In general, the sensor suite 110 may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. The sensors may be located in various positions in and around the AV. Further, the sensors suite 110 may also transmit sensor data (the second sensor data 116) to the fallback compute stack 120 for fallback operations as will be discussed more fully below.

As further shown in FIG. 1, the primary compute stack 120 may include a primary perception module 122, a primary prediction module 124, and a primary planning module 126, each of which may be implemented using any suitable combination of hardware and/or software component(s). For example, the primary perception module 122, the primary prediction module 124, and the primary planning module 126 may coordinate with each other to determine a first path for maneuvering or controlling the AV.

More specifically, the primary perception module 122 may analyze the received sensor data (e.g., camera images, point clouds, location information, etc.) provided by the sensor suite 110 and output an understanding or a perception of the environment surrounding the AV. In particular, the primary perception module 122 may extract information related to navigation and making driving decisions. For instance, the primary perception module 122 may detect objects such as other cars, pedestrians, trees, bicycles, and objects traveling on or near the roadway systems on which the AV traveling, and indications surrounding the AV (such as construction signs, traffic cones, traffic lights, stop indicators, and other street signs). In some examples, the primary perception module 122 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier may recognize pedestrians in the environment of the AV, a vehicle classifier may recognize vehicles in the environment of the AV, etc.

The primary prediction module 124 may perform predictive analysis based on at least some of the recognized objects or perception provided by the primary perception module 122, e.g., to determine projected pathways of other vehicles, bicycles, and pedestrians. The primary prediction module 124 may also predict the AV's future trajectories, which may enable the AV to make appropriate navigation decisions. In some examples, the primary prediction module 124 may include one or more prediction models trained using machine learning to determine future motions and/or trajectories of other traffic agents and/or of the AV itself.

The primary planning module 126 may plan maneuvers for the AV based on map data, data received from the primary perception module 122, prediction information received from the primary prediction module 124, and navigation information, e.g., a route instructed by a fleet management system. In some examples, the primary planning module 126 may receive map data from a map database (e.g., stored locally at the AV or at a remote server) including data describing roadways (e.g., locations of roadways, connections between roadways, roadway names, speed limits, traffic flow regulations, toll information, etc.), buildings (e.g., locations of buildings, building geometry, building types), and other objects (e.g., location, geometry, object type). In some instances, the map database may further include data describing other features, such as bike lanes, sidewalks, crosswalks, traffic lights, parking lots, etc. In general, a map database may include data describing any known, relatively fixed features and/or objects in a geographical area. In some examples, the primary planning module 126 may receive data from the primary perception module 122 describing at least some of the features described by the map data in the environment of the AV. The primary planning module 126 may compare map data with data from the primary perception module 122 to confirm the accuracy of the map data and to determine the precise positions of perceived objects on the map.

The primary planning module 126 may determine a pathway for the AV to follow based on the perception(s) and/or the prediction(s), for example, a route from point A to point B. When the primary perception module 122 detects moving objects in the environment of the AV, the primary planning module 126 may determine a pathway (which may be referred to as a primary path) for the AV based on predicted behaviors of the objects provided by the primary prediction module 124 and right-of-way rules that regulate behavior of vehicles, cyclists, pedestrians, or other objects. The pathway may include locations for the AV to maneuver to, and timing and/or speed of the AV in maneuvering to the locations. In some aspects, as part of determining the pathway for the AV, the primary planning module 126 may utilize a non-convex solver (NCS). An NCS may utilize a graph solver to generate collision-free trajectories for the vehicle with suitable risk and comfort qualities. The primary planning module 126 may select a branch of behavior for the AV to execute based on the collision-free trajectories.

As explained above, the primary compute stack 120 can experience failures or operate under a degraded operational state during which the fallback compute stack 120 may provide fallback controls to allow the AV to recover from the failures or the degraded condition. As shown in FIG. 1, the fallback compute stack 120 may include a fallback perception module 132, a fallback prediction module 134, and a fallback planning module 136, each of which may be implemented using any suitable combination of hardware and/or software component(s). For example, the fallback perception module 132, the fallback prediction module 134, and the fallback planning module 136 may coordinate with each other to calculate an alternative or fallback path for the AV. As explained above, the fallback path may not be activated or used under a normal operating condition and may be activated or used when a failure or a faulty condition occurs at the primary compute stack 120. The selection of whether to utilize the primary path (calculated by the primary compute stack 120) or the fallback path (calculated by the fallback compute stack 130) may be determined by the path multiplexer module 142 at the common stack 140 as will be discussed more fully below.

The fallback perception module 132, the fallback prediction module 134, and the fallback planning module 136 may provide substantially the same functions as the primary perception module 122, the primary prediction module 124, and the primary planning module 126, respectively, but may utilize algorithms that are different from (or orthogonal to) algorithms utilized by the primary perception module 122, the primary prediction module 124, and the primary planning module 126. Using orthogonal algorithms between the primary compute stack 120 and the fallback compute stack 120 can advantageously avoid having both the primary compute stack 120 and the fallback compute stack 120 make the same faulty decision or fail at the same time.

In some aspects, the fallback perception module 132 may utilize heuristic algorithms and/or rules to determine a perception of an environment surrounding the AV instead of machine learning. For instance, the fallback perception module 132 may operate on LIDAR-only sensor data. The fallback perception module 132 may determine the presence of an object, a distance relative to the AV and/or a velocity of an object based on measurements determined from LIDAR point cloud data (e.g., the second sensor data 116). The fallback prediction module 134 may utilize heuristic algorithms and/or rules to predict trajectories of the AV and/or other traffic participants in the AV's vicinity. For instance, the fallback prediction module 134 may use linear extrapolation techniques and/or any other numerical analysis techniques that are not based on machine learning. As will be discussed more fully below, the fallback perception module 132 can generate occupancy grid maps based on the LIDAR point clouds to identify free space(s), occupied space(s), and/or unknown space(s) in a geographical area surrounding the AV.

In some aspects, the fallback perception module 132 may generate the occupancy grid maps repeatedly at a substantially fast rate (e.g., according to a scan frequency of the LIDAR sensors in use) to track objects that are in motion and provide motion information about the tracked objects. Accordingly, the fallback prediction module 134 can predict trajectories of other traffic participants near the AV using the 3D motion grid information.

In some aspects, the fallback planning module 136 may utilize heuristic algorithms and/or rules to plan an alternative path for the AV, for example, to bring the AV to a complete stop at a comfortable deceleration speed and without causing a collision. Additionally or alternatively, the fallback planning module 136 may guide the AV away from a high-risk area (e.g., an intersection, an oncoming traffic lane, an emergency driveway, etc.). For instance, the fallback planning module 136 may perform a search in a search space (e.g., representing an area around the AV and may be a continuous search space or a discretized search space) to determine candidate paths for the AV based on the perception and/or the predictions, determine a heuristic cost for each candidate path, and select a target path with a minimal heuristic cost from the candidate paths. In an example, a heuristic cost may be assigned to each segment of a path, and the cost may vary depending on whether the path segment causes the AV to go straight, turn left, turn right, or reverse, etc. Additionally or alternatively, the fallback planning module 136 may utilize polynomial fitting techniques to determine a path for the AV. In general, the fallback planning module 136 may utilize non-machine learning based techniques.

Further, the fallback planning module 136 may compute a path for the AV using less restrictive planning constraints than the primary planning module 126. As will discussed more fully below, in some instances, the fallback planning module 136 may use free space planning (e.g., without any lane limitation or generally less structural constraints) as opposed to the NCS used by the primary planning module 126. Additionally or alternatively, the fallback planning module 136 may utilize a reduce set of motions for the AV compared to the primary planning module 126. For instance, the fallback planning module 136 may plan a motion including braking, steering the AV within a certain angle less than the full angle range available to the vehicle, decelerating with a certain speed limit less that the full speed range available to the vehicle, etc.

As further shown in FIG. 1, the path multiplexer module 142 may receive a primary path from the primary compute stack 120 as shown by the circle with the numeral 1 and a fallback path from the fallback compute stack 120 as shown by the circle with the numeral 2. The path multiplexer module 142 may select between the primary path and the fallback path and provide the selected path to a control system 150 of the AV. As will be discussed more fully below with reference to FIGS. 2-4, the path multiplexer module 142 may perform the selection based on whether the vehicle (or more specifically the primary planning module 126) is operating under a normal operating condition or a degraded operating condition. For instance, if no degraded operating condition is detected, the path multiplexer module 142 may select the primary path by default. If, however, a degraded condition is detected, the path multiplexer module 142 may select the fallback path over the primary path. An example of a degraded operating condition may be when the primary planning module 126 fails to calculate a valid trajectory or path for the AV. That is, the vehicle may be stuck at a current position. The control system 150 may include hardware and/or software components to generate instructions according to the selected path to control the actuation (e.g., steering, braking, etc.) of the AV.

While FIG. 1 illustrates the control system 150 separate from the AV compute system 100, in some instances, the control system 150 can be part of the AV compute system 100 or at least some of the operations of the control system 150 can be implemented by the AV compute system 100. Further, while FIG. 1 illustrates the modules 122, 124, and 126 as separate modules in the primary compute stack 120, these modules can be combined in any suitable manner. Similarly, the modules 132, 134, and 136 at the fallback compute stack 120 may be combined in any suitable manner.

Figure 2:
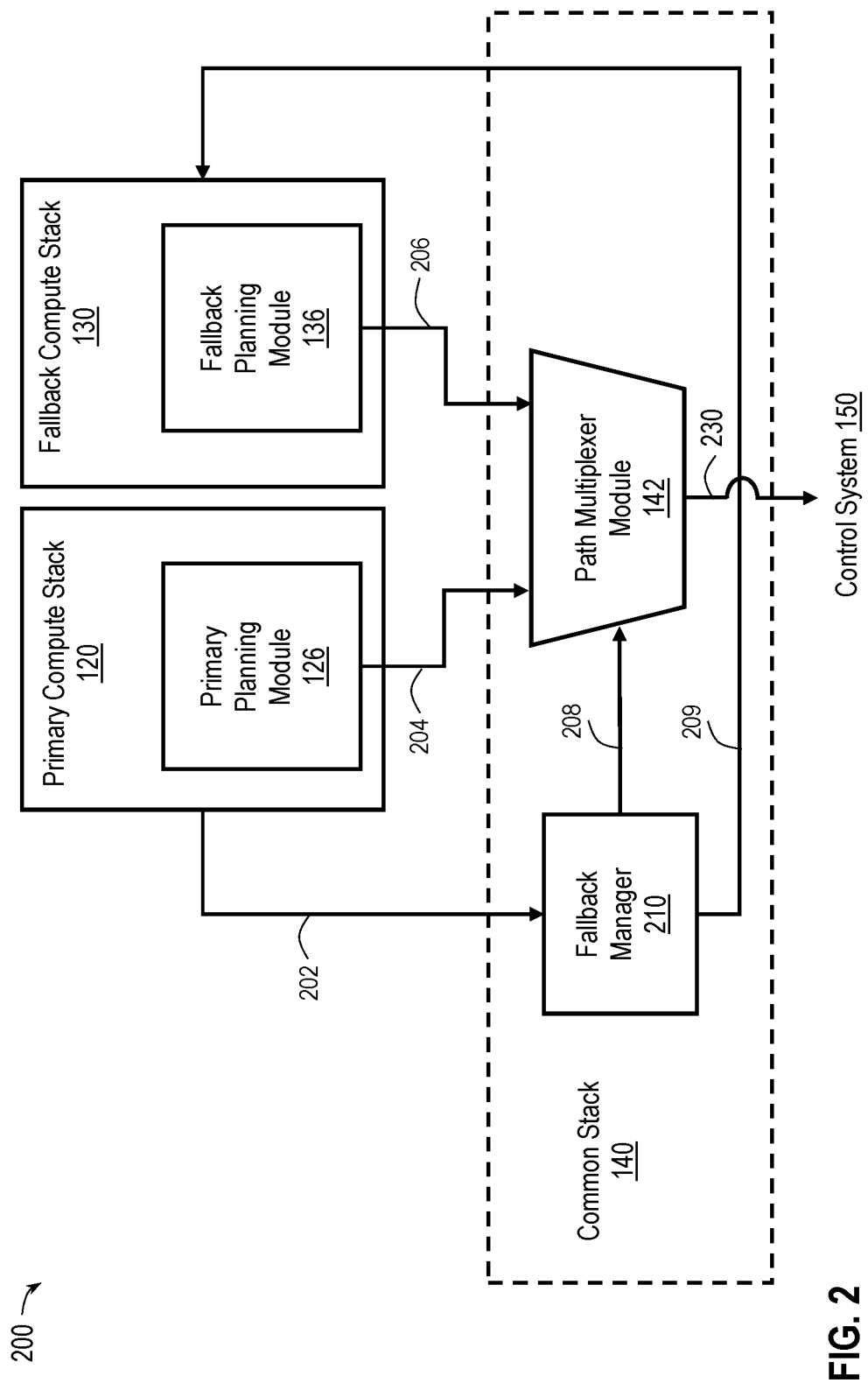
FIG. 2 illustrates an exemplary AV path planning scheme with fallback in response to a degraded state of operation, according to some embodiments of the present disclosure.

FIG. 2 illustrates an exemplary AV path planning scheme 200 with fallback in response to a degraded state of operation, according to some embodiments of the present disclosure. The scheme 200 may be implemented by an onboard AV compute system such as the AV compute system 100 of FIG. 1, the local computing device 1010 of FIG. 10, and the system 1100 of FIG. 11. FIG. 2 provides a more detailed view of the common stack 140 and interactions between the common stack 140, the primary compute stack 120, and the fallback compute stack 130. For simplicity, FIG. 2 only illustrates elements salient for path planning, and the primary compute stack 120, the fallback compute stack 130, and the common stack 140 can include other modules.

As shown in FIG. 2, the common stack 140 may further include a fallback manager 210. The fallback manager 210 may monitor the health or operational conditions of the primary compute stack 120. For instance, the fallback manager 210 may monitor for a degraded operating condition at the primary compute stack 120. As an example, the fallback manager 210 may receive information 202 related to path calculation at the primary compute stack 120. The information 202 may include an indication of whether the primary compute stack 120 fails to receive sensor data from the sensor suite 110, whether the primary compute stack 120 has a failure at its prediction (e.g., failing to determine a perception, failing to predict a trajectory for the vehicle and/or other traffic participants in the environment of the vehicle), and/or whether the primary compute stack 120, or more specifically the primary planning module 126 is unable to calculate a valid path (or trajectory) for the AV. In general, the information 202 may indicate whether there is a faulty condition at any one or more components of the primary compute stack 120.

Upon detecting a degraded operating condition at the primary compute stack 120, the fallback manager 210 may notify the path multiplexer module 142 and the fallback compute stack 130. To reduce a reaction or response time to the detection degraded operating condition, the fallback manager 210 may use event driven mechanisms to notify the path multiplexer module 142 and the fallback compute stack 130 (or more specifically the fallback planning module 136). In this regard, the fallback manager 210 may send an event trigger 208 indicating the degraded operating condition to the path multiplexer module 142 and an event trigger 209 to the fallback compute stack 130. In some instances, the event triggers 208 and 209 may operate similar to an interrupt in which the fallback manager 210 may send the event triggers 208 and 209 as soon as the degraded operating condition is detected. That is, the fallback manager 210 may send those event triggers 208 and 209 any time.

The primary planning module 126 may perform path calculations periodically, for example, at a first path update rate. For instance, the primary planning module 126 may calculate a new path or update a path (a primary path) at each calculation and may send data 204 indicative of the primary path to the path multiplexer module 142. In a similar way, the fallback planning module 136 may perform path calculations periodically, for example, at a second path update rate. For instance, the fallback planning module 136 may calculate a new path or update a path (a fallback path) at each calculation and may send data 206 indicative of the fallback path to the path multiplexer module 142.

The path multiplexer module 142 may select between the primary path or the fallback path and output the selected path 230. In some instances, the path multiplexer module 142 may send data associated with the selected path 230 to the control system 150. Under a normal operating condition, the path multiplexer module 142 may select the primary path and send the data 204 indicative of the primary path to the control system. If, however, the path multiplexer module 142 receives the event trigger 208 from the fallback manager 210, the path multiplexer 142 may select the fallback path over the primary path and send the data 206 indicative of the fallback path to the control system 150.

In some aspects, the first path update rate (or frequency) at which the primary planning module 126 may calculate a primary path can be the same as the second path update rate (or frequency) at which the fallback planning module 136 may calculate a fallback path. In other aspects, the first path update rate at which the primary planning module 126 may calculate a primary path can be different than the second path update rate at which the fallback planning module 136 may calculate a fallback path. In general, the primary planning module 126 and the fallback planning module 136 may perform path calculations independently and asynchronously.

Because the notification of the degraded operating condition is event driven, the path multiplexer module 142 may receive, from the fallback planning module 136, the event trigger 208 at a time prior to a next path update time. To further reduce the response time to the degraded operating condition, the path multiplexer module 142 may save the fallback path data 206 to a memory during normal operations and may retrieve the fallback path data 206 from the memory upon receiving the event trigger 208 and output the retrieved fallback path data 206 to the control system 150 instead of waiting till the next path update is received from the fallback planning module 136. Similarly, because the notification of the degraded operating condition is event driven, the fallback planning module 136 may receive the event trigger 209 at a time prior to a next fallback path calculation. To further reduce the response time (or provide a corrective action earlier) to the degraded operating condition, the fallback planning module 136 may calculate or update a fallback path upon receiving the event trigger 209 instead of according to the second path update rate. That is, the fallback planning module 136 can perform an out-of-cycle path calculation (e.g., an additional path calculation between two regular path updates according to the second path update rate).

Figure 3:
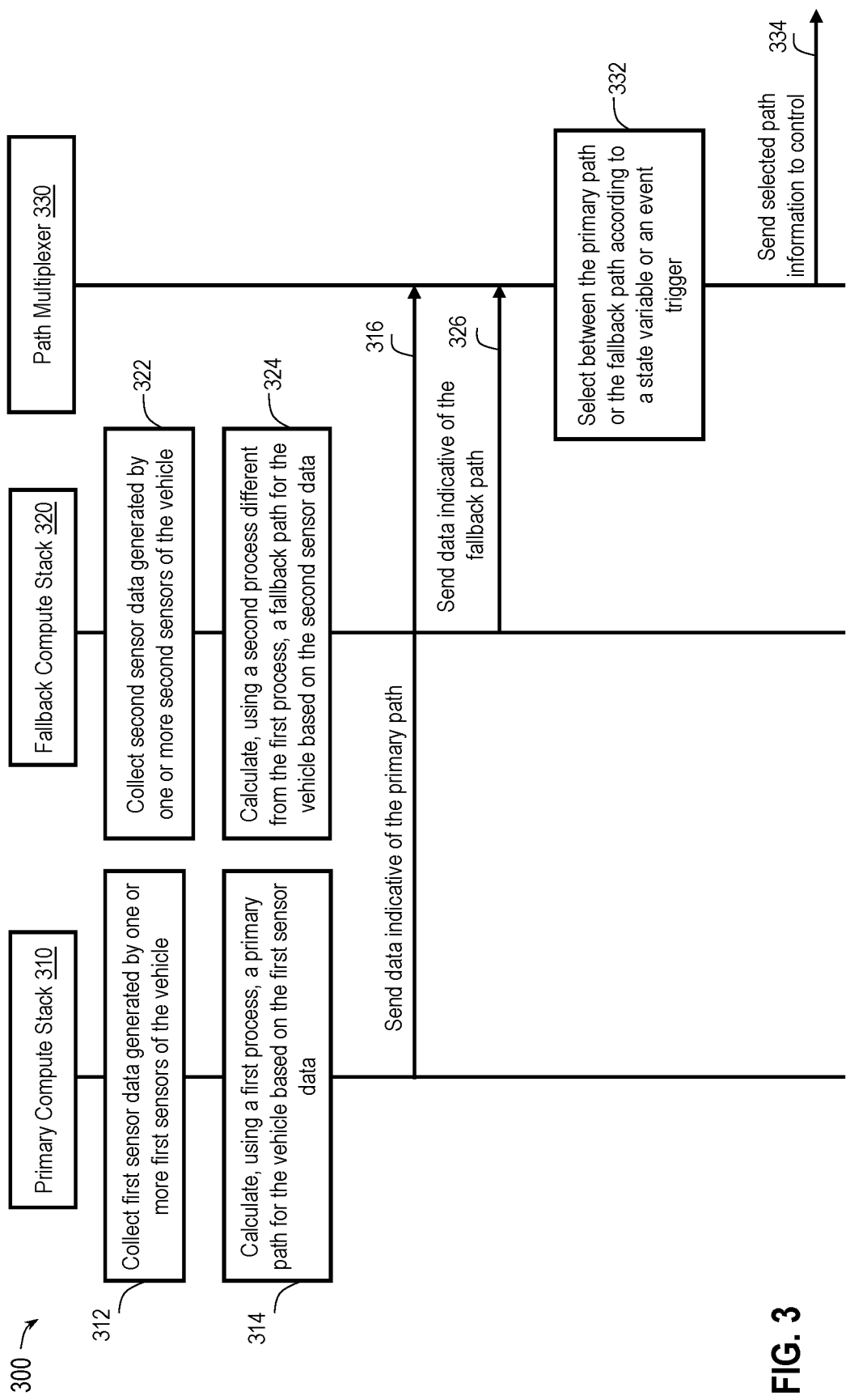
FIG. 3 is a sequence diagram illustrating a process for operating an AV with fallback path planning, according to some embodiments of the present disclosure.

FIG. 3 is a sequence diagram illustrating a process 300 for operating an AV with fallback path planning, according to some embodiments of the present disclosure. The process 300 may be implemented by an onboard AV compute system such as the AV compute system 100 of FIG. 1, the local computing device 1010 of FIG. 10, and the system 1100 of FIG. 11. More specifically, the process 300 may be implemented between a primary compute stack 310, a fallback compute stack 320, and a path multiplexer 330. The primary compute stack 310, the fallback compute stack 320, and the path multiplexer 330 may be included at a vehicle (e.g., the AV 502 of FIGS. 5A-5B, 6, and 7A-7D or the AV 1002 of FIG. 10) for controlling the vehicle. In some aspects, the primary compute stack 310, the fallback compute stack 320, and the path multiplexer 330 may correspond to the primary compute stack 120, the fallback compute stack 120, and the path multiplexer module 142 discussed above with reference to FIGS. 1-2, respectively. Operations are illustrated once each and in a particular order in FIG. 3, but the operations may be performed in parallel, reordered, and/or repeated as desired. For instance, the primary compute stack 310 may perform the operations at 312, 314, and 316 in parallel with the fallback compute stack 320 performing the operations at 322, 324, and 326.

At 312, the primary compute stack 120 may collect first sensor data (e.g., the first sensor data 114) generated by one or more first sensors of the vehicle. The one or more first sensors may be similar to the sensors in the sensor 112 of FIG. 1.

At 314, the primary compute stack 310 may calculate, using a first process (or algorithm(s)), a primary path for the vehicle based on the first sensor data. The first process can include determining a perception of an environment surrounding the vehicle based on the first sensor data, predicting trajectories of the vehicle and/or other traffic participants in the environment based on the perception, and planning a path for the vehicle based on the prediction(s), for example, as discussed above with reference to FIG. 1.

At 322, the fallback compute stack 320 may collect second sensor data (e.g., the second sensor data 116) generated by one or more second sensors of the vehicle. The one or more second sensors may be similar to the sensors 112 of FIG. 1. In some aspects, the second sensor data may be a subset of the first sensor data collected by the primary compute stack 310 at 312 and the subset is less than all of the first sensor data. That is, the one or more second sensors may be a subset of the one or more first sensors. For instance, the one or more first sensors may include cameras and LIDAR sensors on the vehicle, and the one or more second sensors may correspond to the LIDAR sensors. As such, the first sensor data may include image data from the cameras and point clouds from the LIDAR sensors, whereas the second sensor data may include the point clouds (LIDAR data) but not the image data. In other aspects, the one or more second sensors may be separate from the one or more first sensors (e.g., for example, to provide sensor hardware redundancy). For instance, the one or more first sensors may include cameras and LIDAR sensors on the vehicle, and the one or more second sensors may include other LIDAR sensors on the vehicle. Thus, the second sensor data may be separate from the first sensor data. In some examples, all of the one or more second sensors are LIDAR sensors.

At 324, the fallback compute stack 320 may calculate, using a second process (or algorithm(s)) different from the first process, a fallback path (e.g., an alternative path) for the vehicle based on the second sensor data. The second process can include determining a perception of an environment surrounding the vehicle based on the second sensor data, predicting trajectories of the vehicle and/or other traffic participants in the environment based on the perception, and computing a path for the vehicle based on the predictions. In some aspects, the goal of the fallback compute stack 320 is to bring the vehicle to a complete stop at a comfortable speed (e.g., no hard brake if unnecessary) and without causing any collision (e.g., avoid rear end collision, etc.) if the primary compute stack 310 fails to operate the vehicle (e.g., fails to calculate a valid path for the vehicle). Thus, the fallback path may include one or more waypoints that navigates the vehicle to a complete stop. In some aspects, as part of calculating the fallback path, the fallback compute stack 320 may determine a motion plan for the vehicle based on a parameter associated with at least one of a deceleration, a traffic rule, or a passenger comfort level. FIGS. 5A-5B, 6, 7A-7D illustrate some examples of operations of a fallback compute stack in navigating a vehicle to a stop upon entering a degraded state of operation.

In some aspects, the first process used by the primary compute stack 310 to calculate the primary path at 314 may use machine learning algorithms while the second process used by the fallback compute stack 320 to calculate the fallback path at 324 may use heuristic algorithms (e.g., rules are interpretable and/or analysis that are expressible by mathematical equations).

In some aspects, the primary compute stack 310 may calculate the primary path at 314 using a first set of constraints (e.g., planning constraints) while the fallback compute stack 320 may calculate the fallback path using a second set of constraints (e.g., planning constraints) different from the first set of constraints. For instance, the second set of constraints may be less stringent and/or include a fewer number of constraints than the first set of constraints. Further, in some aspects, the fallback compute stack 320 may calculate the primary path based on occupancy grid maps, motion information of traffic participants in the environment, and free space planning (e.g., independent of any lane limitation).

At 316, the primary compute stack 310 may send, and the path multiplexer 330 may receive, data (e.g., the data 204) indicative of the primary path. In some examples, the data indicative of the primary path may include a current position of the vehicle, one or more waypoints, a speed, an acceleration, and/or a sequence of planned maneuvers for the vehicle, such as going straight, followed by making a turn, etc.

At 326, the fallback compute stack 320 may send, and the path multiplexer 330 may receive, data indicative of the fallback path. In some examples, the data indicative of the fallback path may include a current position of the vehicle, one or more waypoints, a speed, an acceleration, and/or a sequence of planned maneuvers for the vehicle, such as going straight, followed by making a turn and stop, etc. In general, the primary path and the fallback path may have a least one different path characteristics (e.g., a different waypoint, a different speed, etc.).

At 332, the path multiplexer 330 may select between the primary path or the fallback path according to a state variable or an even trigger indicative of whether the primary compute stack 310 is operating in a normal operating condition or a degraded operational state. The selection and the control switching from the primary compute stack 310 to the fallback compute stack 320 will be discussed more fully below with reference to FIG. 4.

At 334, the path multiplexer 330 may send the selected path information to a control system (e.g., the control system 150) of the vehicle.

Figure 4:
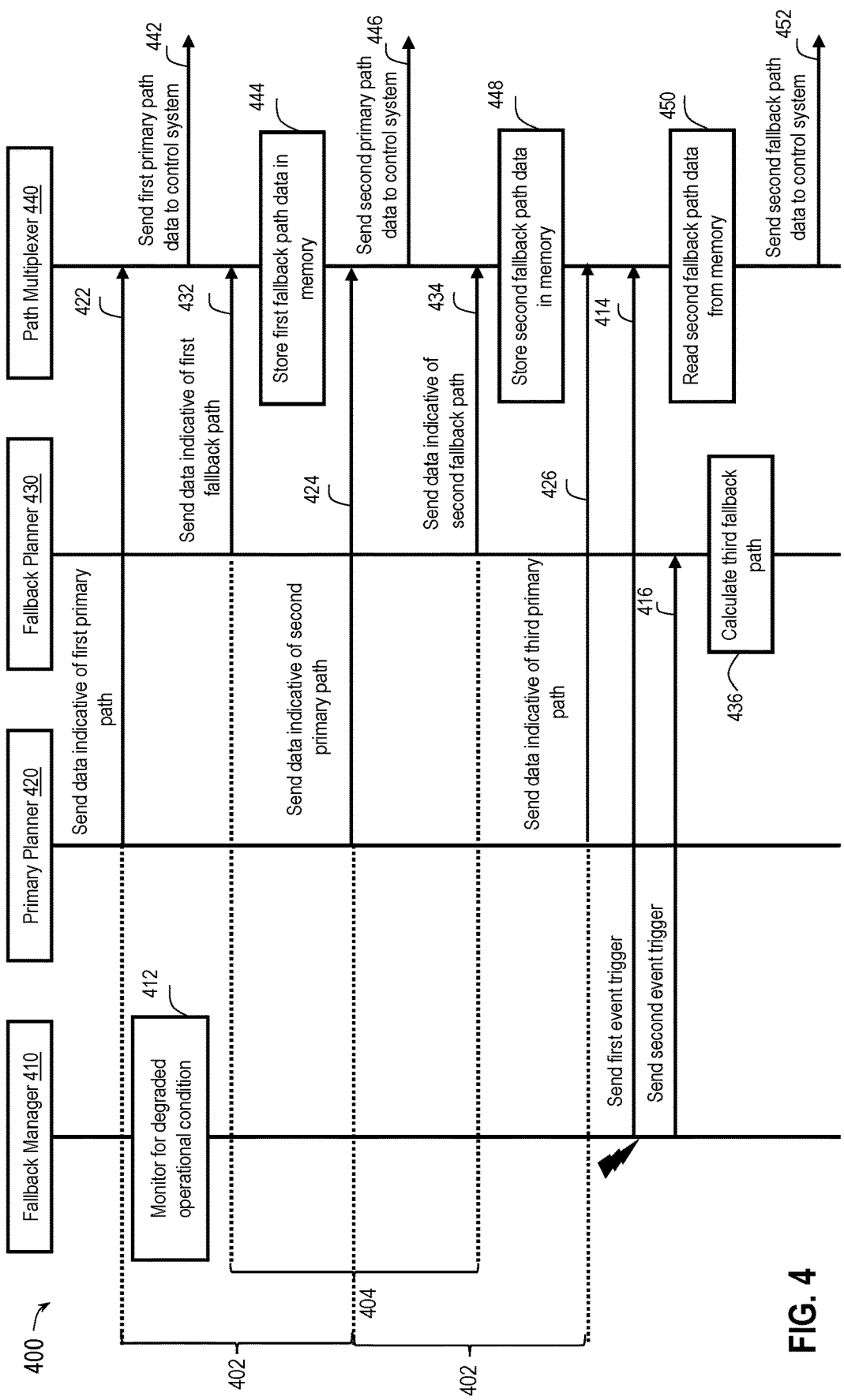
FIG. 4 is a sequence diagram illustrating a process for operating an AV with fallback path planning, according to some embodiments of the present disclosure.

FIG. 4 is a sequence diagram illustrating a process 400 for operating an AV with fallback path planning, according to some embodiments of the present disclosure. The process 400 may be implemented by an onboard AV compute system such as the AV compute system 100 of FIG. 1, the local computing device 1010 of FIG. 10, and the system 1100 of FIG. 11. More specifically, the process 400 may be implemented between a fallback manager 410, a primary planner 420, a fallback planner 430, and a path multiplexer 440. In some examples, the fallback manager 410 and the path multiplexer 440 may be part of the common stack 130, the primary planner 420 may be part of the primary compute stack 310, and the fallback planner 430 may be part of the fallback compute stack 320. In some aspects, the fallback manager 410, the primary planner 420, the fallback planner 430, and the path multiplexer 440 may correspond to the fallback manager 210, the primary planning module 126, the fallback planning module 136, and the path multiplexer module 142 discussed above with reference to FIGS. 1-2, respectively. The process 400 may provide a more detailed view of fallback failover mechanisms in response to a degraded operating condition. Operations are illustrated once each and in a particular order in FIG. 4, but the operations may be performed in parallel, reordered, and/or repeated as desired.

At 412, the fallback manager 410 may monitor for a degraded operating condition. In some examples, the fallback manager 410 may receive information related to path calculation at the primary compute stack 120 as discussed above with reference to FIG. 2. In some instance, the fallback manager 410 may perform the monitoring periodically, for example, according to a certain rate or frequency.

The primary planner 420 may perform primary path calculations according to a first path update rate (e.g., at every time interval 402) and send information associated with the calculated primary path to the path multiplexer 440. For instance, at 422, the primary planner 420 may send, and the path multiplexer 440 may receive, data indicative of a first primary path calculated by the primary planner 420. At 424, the primary planner 420 may send, and the path multiplexer 440 may receive, data indicative of a second primary path calculated by the primary planner 420. At 426, the primary planner 422 may send, and the path multiplexer 440 may receive, data indicative of a third primary path calculated by the primary planner 422.

The fallback planner 430 may perform fallback path calculations according to a second path update rate (e.g., at every time interval 404) and send information associated with the calculated fallback path to the path multiplexer 440. For instance, at 432, the fallback planner 430 may send, and the path multiplexer 440 may receive, data indicative of a first fallback path calculated by the fallback planner 430. At 434, the fallback planner 430 may send, and the path multiplexer 440 may receive, data indicative of a second fallback path calculated by the fallback planner 430. In some examples, the second path update rate can be the same as the first update rate. In other examples, the second path update rate may be different from the first path update rate. In general, the second path update rate (of the fallback planner 430) can be configured independent of the first path update rate (of the primary planner 420).

The path multiplexer 440 may select between a primary path calculated by the primary planner 420 or a fallback path calculated by the fallback planner 430. Under a normal operating condition (i.e., not a degraded state), the path multiplexer 440 may select the primary path. For instance, at 442, the path multiplexer 440 may select the first primary path and send data indicative of the first primary path to a control system (e.g., to a control system 150) of the vehicle. Again, at 446, the path multiplexer 440 may select the second primary path and send data indicative of the second primary path to the control system.

To reduce the reaction or response time in the event of a degraded operational state, the path multiplexer 440 may store data of fallback paths received from the fallback planner 430 while operating under a normal operating condition. For instance, at 444, upon receiving the data indicative of the first fallback path, the path multiplexer 440 may store the first fallback path data in a memory. Similarly, at 448, upon receiving the data indicative of the second fallback path, the path multiplexer 440 may store the second fallback path data in the memory. In some instances, the path multiplexer 440 may replace the data indicative of the first fallback path stored at the memory with the newly received data indicative of the second fallback path.

As further shown in FIG. 4, at 414, the fallback manager 410 may send, and the fallback planner 430 may receive, a first event trigger. For instance, the fallback manager 410 may detect a degraded operating condition (shown by the lighting bolt symbol) and may send the first event trigger in response to the detected degraded operating condition. The first event trigger may indicate the degraded operating condition.

In response to the first event trigger, the path multiplexer 440 may select the fallback path over the primary path. For instance, at 452, the path multiplexer 440 may read from memory a last known fallback path (e.g., the second fallback path). At 452, the path multiplexer 440 may send the read data indicative of the second fallback path to the control system.

As further shown in FIG. 4, at 416, in response to the detected degraded operating condition, the fallback manager 410 may also send a second event trigger to the fallback planner 430, and the fallback planner 430 may receive the second event trigger. At 436, in response to the second event trigger, the fallback planner 430 may calculate a third fallback path for the vehicle. In some instances, the fallback planner 430 may receive the event trigger before a next path update time (according to the repeating time interval 404). To reduce a response time for the degraded operating condition, the fallback planner 430 may calculate the third fallback path prior to the next path update time. In this way, the fallback planner 430 may provide the path multiplexer 440 with a new fallback path at an earlier time.

In some aspects, the path multiplexer 440 may track whether the vehicle is operating under a normal condition or a degraded condition. For instance, the path multiplexer 440 may initialize a state variable to a first state to indicate the vehicle is operating under a normal condition. Upon receiving an event trigger indicating the vehicle is operating under a degraded condition (e.g., at 414), the path multiplexer 440 may update the state variable from the first state to a second state. As such, the path multiplexer 440 may select a fallback path (calculated by the fallback planner 430) over a primary path (calculated by the primary planner 420) when the state variable is set to the second state. If the fallback manager 410 detected that the vehicle, or more specifically the primary planner 420, recovers from the degraded condition, the fallback manager 410 may sent another event trigger to the path multiplexer 440 and/or the fallback planner 430 to indicate the successful recovery from the degraded condition. Upon receiving the event trigger indicating the successful recovery, the path multiplexer 440 may update the state variable from the second state to the first state. Accordingly, the path multiplexer 440 may return to select a primary path (calculated by the primary planner 420) and send data indicative of the primary path to the control system and continue to store fallback path information received from the fallback planner 430.

In some aspects, the path multiplexer 440 may determine whether data of a fallback path stored at the memory is valid upon receiving the first event trigger at 414. For instance, if a duration between a time when the data indicative of the second fallback path is received and a time when the first event trigger is received is less than a threshold, the stored fallback path data is valid and the path multiplexer 440 may send the stored second fallback path data to the control system, If, however, the duration between the time when the data indicative of the second fallback path is received and the time when the event trigger is received is greater than a threshold, the stored second fallback path data is invalid (or stale) and the path multiplexer 440 may refrain from using the stored second fallback path data to control the vehicle. In some aspects, the path multiplexer 440 may utilize a timer to track an age of stored fallback path data and may remove the stored fallback path data from the memory upon an expiration of the timer.

In some aspects, if the path multiplexer 440 has no valid fallback path information from the secondary fallback planer at the time when a degraded condition event trigger is received, the path multiplexer 440 may notify the fallback manager 410. In response, the fallback manager 410 may increase a degradation level to a next degradation level and send an indication of a further degraded state of operation. For instance, if the vehicle is operating at a degradation level "X", the fallback manager 410 may send an indication that the operation of the vehicle is degraded to a next level "Y". In some examples, the indication of the further degraded state of operations may trigger tertiary mechanisms, for example, at a low-level control system of the vehicle in which operations such as steadying the steering wheel and/or ramping up the brake pressure (yet maintaining a comfortable deceleration speed) in order to bring the vehicle to a stop may be triggered.

In some aspects, the path multiplexer 440 may include an indication of a source of a selected path when outputting the selected path information to the control system. For instance, at 442, the path multiplexer 440 may send a message including the first primary path data and an indication that the primary planner 420 is a source of the first primary path data. Similarly, at 446, the path multiplexer 440 may send a message including the second primary data and an indication that the primary planner 420 is a source of the second primary path data. At 452, the path multiplexer 440 may send a message including the second fallback path data and an indication that the fallback planner 430 is a source of the second fallback path data. Notifying each of the primary planner 420 and the fallback planner 430 whether they are in control of the vehicle can allow the primary planner 420 and the fallback planner 430 to seed their path calculation accordingly. For instance, if a planner is not in control of the vehicle, it may be desirable for the planner to seed its path calculation from an actual current position of the vehicle (e.g., obtained from location sensors at the vehicle). On the other hand, if a planner is in control of the vehicle, the planner can seed its path calculation from a virtual position of the vehicle (e.g., based on a previous path calculation).

In some aspects, in response to the first event trigger received at 414, the path multiplexer 440 may further send, to the fallback planner 430, an indication that the fallback planner 430 has control of the vehicle. The path multiplexer 440 may also send, to the primary planner 420, an indication that the primary planner 420 is not in control of the vehicle. In some aspects, the fallback planner 430 may obtain a current location of the vehicle (e.g., from location sensors) and calculate a fallback path from the current location for the vehicle. In some aspects, if the fallback planner 430 is in control of the vehicle (e.g., based on the indication received from the path multiplexer 440), the fallback planner 430 may calculate or update a fallback path using a virtual location (obtained from the last fallback path calculation) as a starting point.

In some examples, the fallback manager may perform degraded operating condition monitoring (e.g., at 412) at a faster frequency than at least one of a primary path update frequency at which the primary planner 420 calculates a primary path or a fallback path update frequency at which the fallback planner 430 calculates a fallback path. In some examples, the path multiplexer 440 may perform the path selection at a faster frequency than at least one of a primary path update frequency at which the primary planner 420 calculates a primary path or a fallback path update frequency at which the fallback planner 430 calculates a fallback path.

Figure 10:
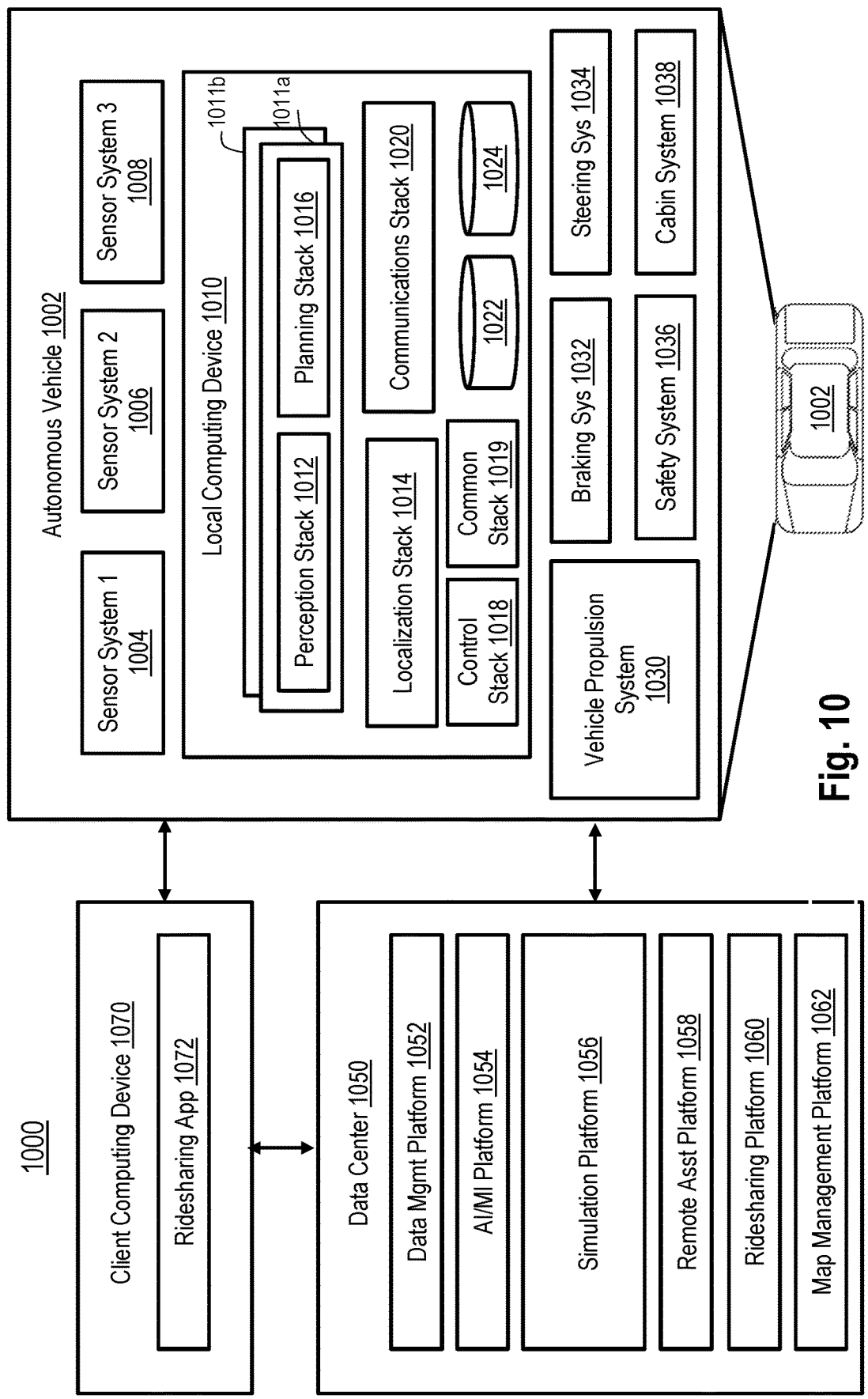
FIG. 10 illustrates an example system environment that may be used to facilitate AV dispatch and operations, according to some aspects of the disclosed technology.

FIGS. 5A-5B, 6, and 7A-7D illustrate various scenarios when fallback path planning is used at an AV 502 (e.g., AV 1002 of FIG. 10). For instance, the AV 502 may include a primary compute stack (e.g., the primary compute stacks 110 and/or 310), a fallback compute stack (e.g., the fallback compute stacks 120 and/or 320), and a path multiplexer (e.g., the path multiplexer module 142, the path multiplexer 330, and/or the path multiplexer 440) as discussed above with reference to FIGS. 1-4.

FIG. 5A illustrates an exemplary scenario 500 in which the fallback compute stack of the AV 502 takes control of the AV 502, according to some embodiments of the present disclosure. In the scenario 500, the AV 502 may be traveling along a roadway with parked vehicles 504 and 506. The path multiplexer of the AV 502 may switch to select a fallback path from the fallback compute stack to direct the AV 502 to change lane so that the AV 502 may avoid colliding with the double-parked vehicle 506 as shown by the series of boxes representing a progression of the AV 502 from time t1 to time (t1+K1).

FIG. 5B illustrates an exemplary scenario 510 in which the fallback compute stack of the AV 502 takes control of the AV 502, according to some embodiments of the present disclosure. In the scenario 510, the path multiplexer of the AV 502 may switch to select a fallback path from the fallback compute stack to avoid cones (shown by the dots in FIG. 5B) and parked vehicles 504, and reaching a pullover location as shown by the series of boxes representing a progression of the AV 502 from time t2 to time (t2+K2).

Figure 6:
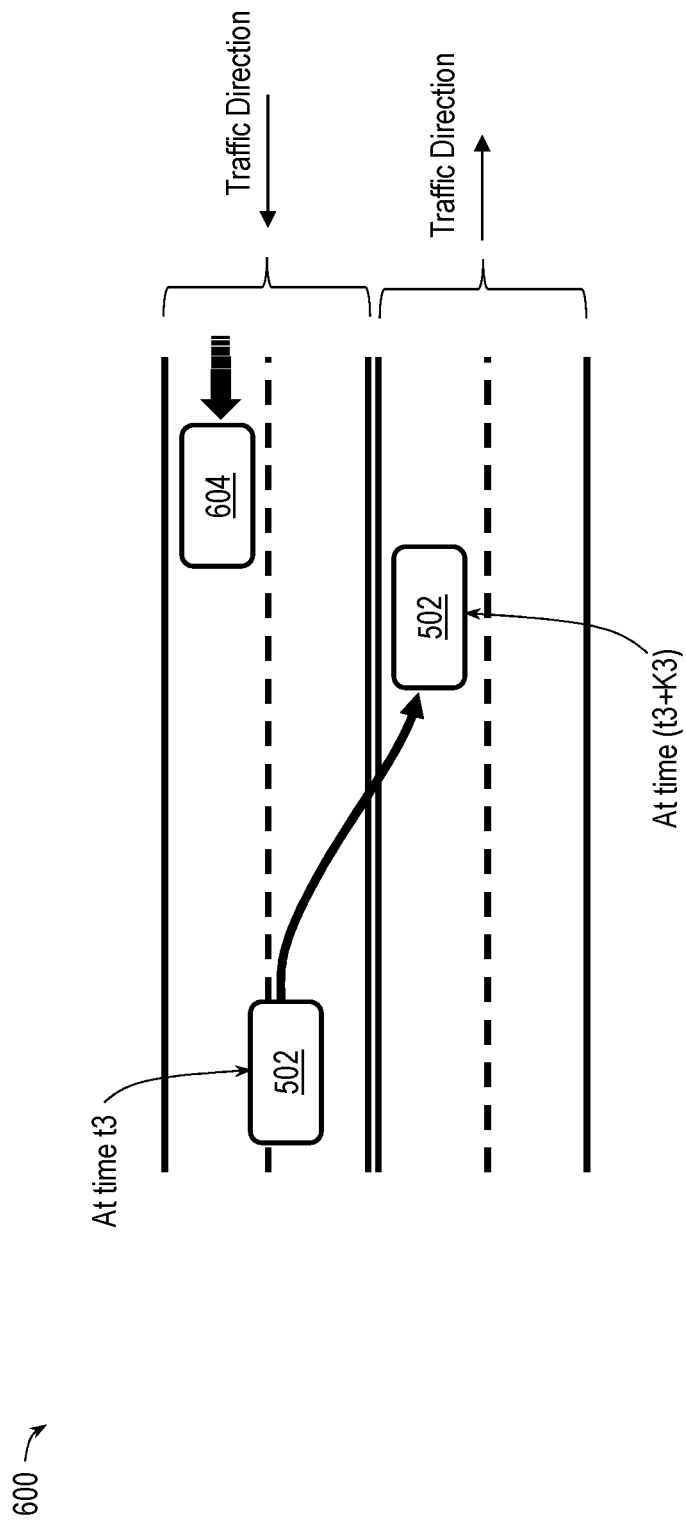
FIG. 6 illustrates an exemplary scenario in which a fallback compute stack of an AV performs autonomous creeping, according to some embodiments of the present disclosure.

FIG. 6 illustrates an exemplary scenario 600 in which the fallback compute stack of the AV 502 performs autonomous creeping after taking control of the AV 502, according to some embodiments of the present disclosure. In the scenario 600, the AV 502 is in a lane for oncoming traffic at time t3. As shown, a vehicle 604 is traveling in an opposite direction than the AV 502. For instance, the fallback compute stack of the AV 502 may have brought the AV 502 to a stop after taking control of the AV 502, but the stopped area is in an oncoming lane. Under such a condition, the path multiplexer of the AV 502 may switch to select a fallback path from the fallback compute stack to move the AV 502 back to a nearest with the same traffic direction that the AV 502 is heading as shown by the arrow from time t3 to time (t3+K3).

FIGS. 7A-7D illustrate various scenarios in which the fallback compute stack of an AV 502 performs autonomous creeping upon the AV 502 stopping or entering an intersection area (e.g., a high-risk area) after the fallback compute stack of the AV 502 brings the AV 502 to a stop. The fallback compute stack of the AV 502 may find the least risky lane to guide the AV 502 to creep out of the intersection area.

Figure 7B:
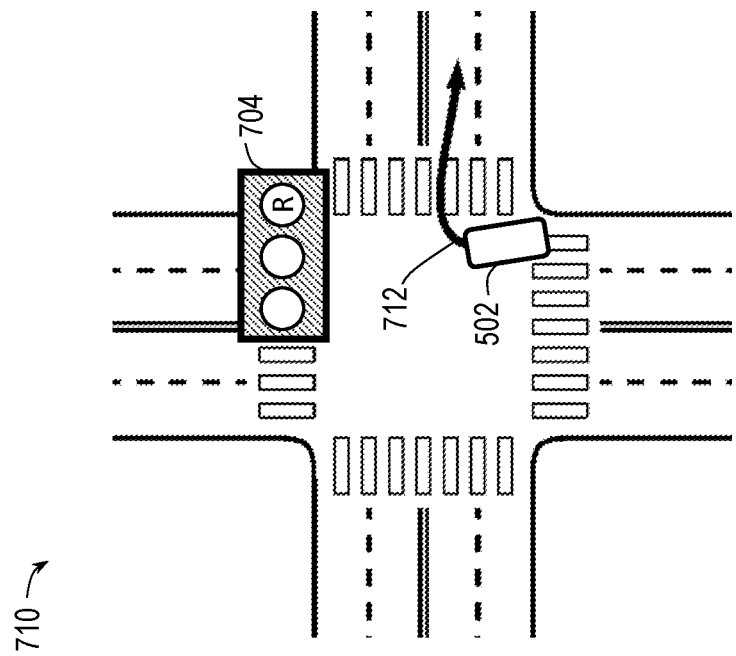
FIG. 7B illustrates an exemplary scenario in which a fallback compute stack of an AV performs autonomous creeping after taking control of the AV, according to some embodiments of the present disclosure.
Figure 7A:
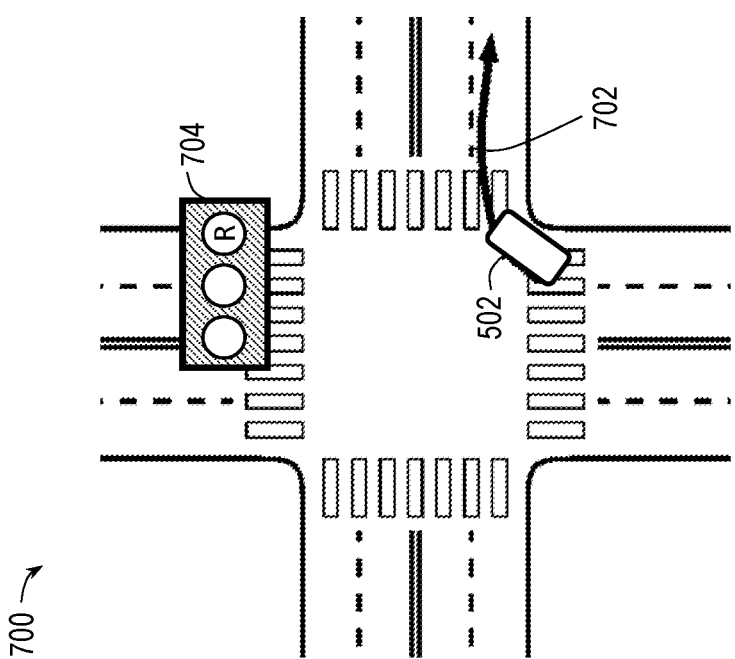
FIG. 7A illustrates an exemplary scenario in which a fallback compute stack of an AV performs autonomous creeping after taking control of the AV, according to some embodiments of the present disclosure.

FIG. 7A illustrates an exemplary scenario 700 in which the fallback compute stack of an AV 502 performs autonomous creeping after taking control of the AV 502, according to some embodiments of the present disclosure. In the scenario 700, the AV 502 stops at a right turn lane. In general, the fallback compute stack of the AV 502 may direct the AV 502 to make a right turn as the highest priority when the AV 502 stops at a right turn lane. For instance, the path multiplexer of the AV 502 may switch to select a fallback path from the fallback compute stack to direct the AV 502 to make a right turn maneuver as long as the AV 502 is allowed to turn right, is on the rightmost lane, and/or kinematically feasible to turn right without driving into oncoming traffic lanes. As shown in FIG. 7A, the fallback compute stack of the AV 502 directs the AV 502 to make a right turn (shown by the arrow 702) even when the traffic light 704 is showing a red light (shown by the circle with the letter "R"), provided no collision may occur. If the traffic light 704 is showing a green light, the fallback compute stack of the AV 502 may also direct the AV 502 to make a right turn.

FIG. 7B illustrates an exemplary scenario 710 in which the fallback compute stack of an AV 502 performs autonomous creeping after taking control of the AV 502, according to some embodiments of the present disclosure. In the scenario 710, the AV 502 stops at a location that passes the right turn lane. Under such a condition, the fallback compute stack of the AV 502 may still direct the AV 502 to make a right turn (shown by the arrow 712) irrespective of whether the traffic light 704 shows a green light or a red light, provided no collision may occur.

Figure 7D:
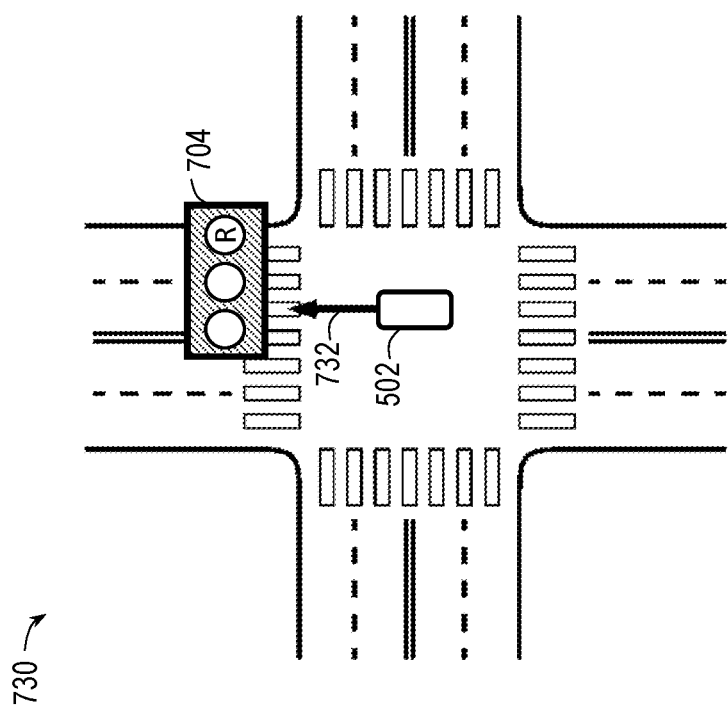
FIG. 7D illustrates an exemplary scenario in which a fallback compute stack of an AV performs autonomous creeping after taking control of the AV, according to some embodiments of the present disclosure.
Figure 7C:
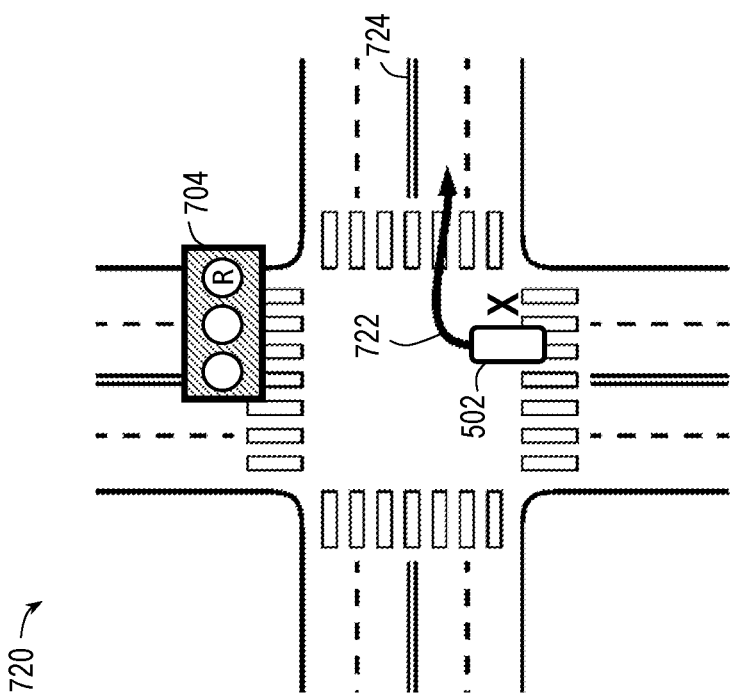
FIG. 7C illustrates an exemplary scenario in which a fallback compute stack of an AV performs autonomous creeping after taking control of the AV, according to some embodiments of the present disclosure.

FIG. 7C illustrates an exemplary scenario 720 in which the fallback compute stack of an AV 502 performs autonomous creeping after taking control of the AV 502, according to some embodiments of the present disclosure. In the scenario 720, the AV 502 stops at a location that blocks a right crossing lane (shown by the symbol "X") but has not passed a center boundary 724 or median of the road for crossing traffic. Under such a condition, the fallback compute stack of the AV 502 may direct the AV 502 to make a right turn (shown by the arrow 722) when the traffic light 704 is showing a red light, provided no collision may occur. If, however, the traffic light 704 is showing a green light, the fallback compute stack of the AV 502 may direct the AV 502 to continue to go straight, exiting the intersection area.

FIG. 7D illustrates an exemplary scenario 730 in which the fallback compute stack of an AV 502 performs autonomous creeping after taking control of the AV 502, according to some embodiments of the present disclosure. In the scenario 730, the AV 502 stops at a location that passes a center boundary or median of the road for crossing traffic and not possible to turn right. Under such a condition, the fallback compute stack of the AV 502 may direct the AV 502 to continue to go straight (shown by the arrow 732), exiting the intersection area irrespective of whether the traffic light 704 shows a green light or a red light, provided no collision may occur.

Figure 8:
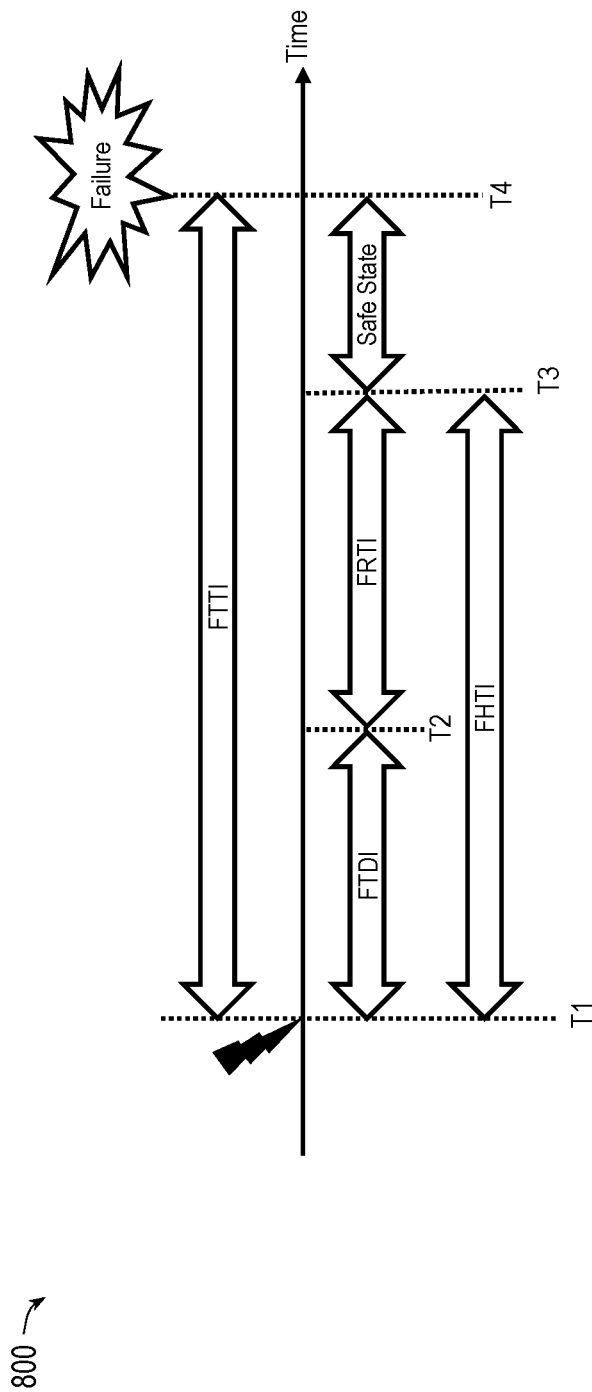
FIG. 8 is a timing diagram illustrating an exemplary vehicle fault detection and handling timeline.

FIG. 8 is a timing diagram illustrating an exemplary vehicle fault detection and handling timeline 800. In some examples, a fallback manager (e.g., the fallback managers 210 and/or 410), a fallback planner (e.g., the fallback planning module 136 and/or the fallback planner 430), and a path multiplexer (e.g., the path multiplexer module 142 and/or the path multiplexer 440) at a vehicle may coordinate with each other to provide a response time that can satisfy a certain safety standard (e.g., ISO 26262).

As shown in FIG. 8, at time T1, a fault condition or a degraded operating condition (shown by the lighting bolt symbol) may occur at the vehicle (e.g., at a primary compute stack 120 or 310). A failure may occur at the vehicle after a fault tolerant timer interval (FTTI) at T4 if no fallback action is applied. The vehicle may take a fault detection timer interval (FDTI) (e.g., from time T1 to T2) to detect the occurrence of the fault condition or a degraded operating condition. The vehicle may take a fault reaction time interval (FRTI) (e.g., from time T2 to T3) to respond to the fault condition or a degraded operating condition. That is, a sum of the FDTI and the FRTI is a fault handling timer interval (FHTI) of the vehicle. The goal is to reduce FHTI such that the fault condition or a degraded operating condition can be handled before the failure at time T4 (e.g., with a remaining safe state time interval before the failure that would have otherwise occurred at time T4). The event driven mechanisms used by the fallback manager and the utilization of a last known fallback path by the path multiplexer for control upon a degraded operating condition discussed herein can advantageously reduce the FRTI.

In some aspects, the common stack 140 (or the path multiplexer planning module 142) may report one or more metrics related to FTTI, FTDI, FTRI, and/or FHTI. For instance, the common stack 140 may further include a diagnostic module to receive the one or more FTTI, FTDI, FTRI, and/or FHTI metrics, calculate statistics related to the metrics, and provide the statistics to the fallback manager 210. The fallback manager 210 can adjust or update its degraded operating condition monitoring (e.g., monitoring frequency) based on the statistics. In general, there are two use cases (e.g., an online use case and an offline use case) for reporting these time intervals and latency. For example, the online use case may be for raising diagnostic faults in case there is an issue with a fallback path, which would lead to a more degraded state of operation. The offline use case may be for calculating the end-to-end system latency, which among other things may allow for comparison of AV's reaction time to that of human drivers.

Figure 9:
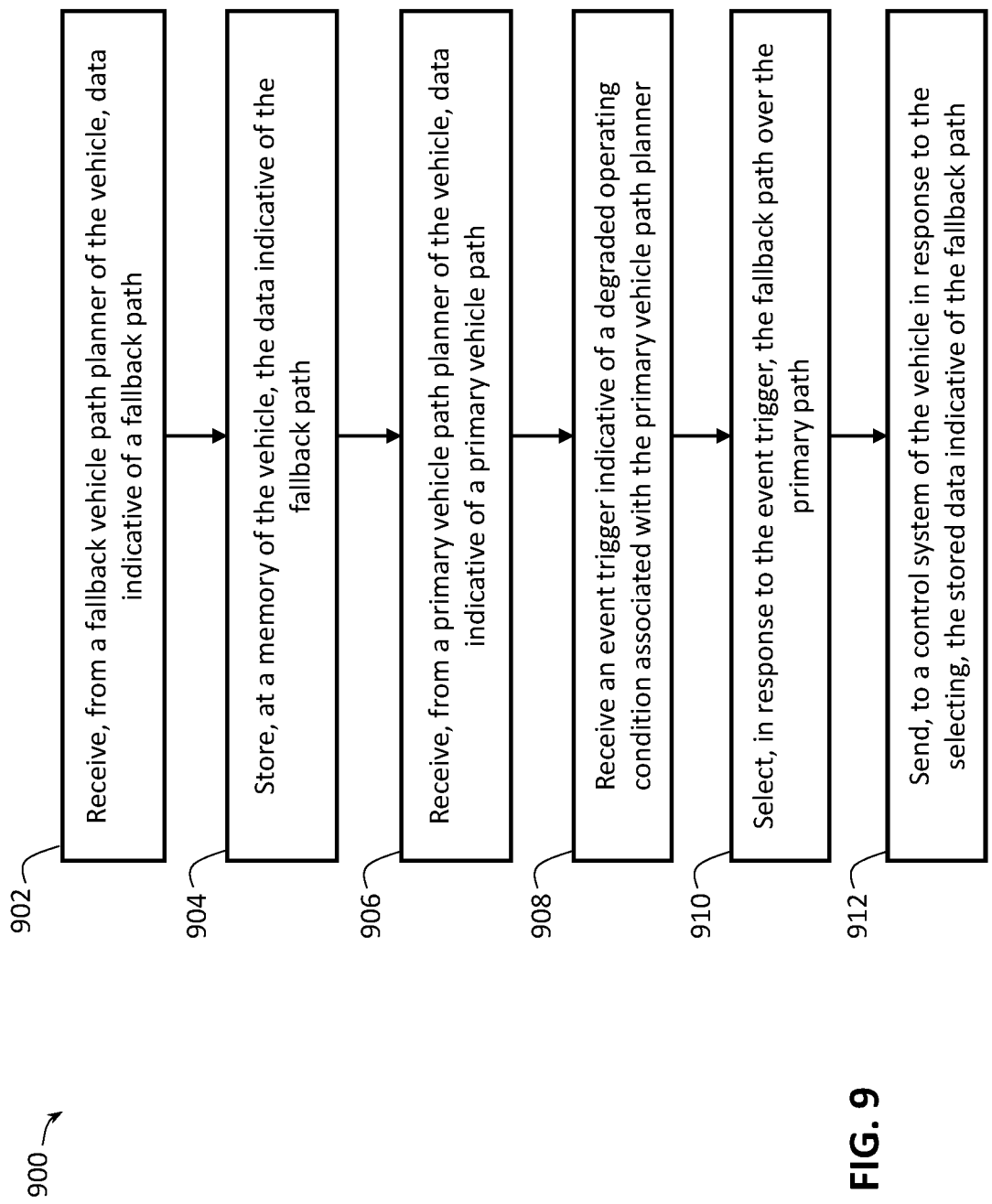
FIG. 9 is a flow diagram illustrating an exemplary process for operating an AV with fallback path planning, according to some embodiments of the present disclosure.

FIG. 9 is a flow diagram illustrating an exemplary process 900 for operating an AV with fallback path planning, according to some embodiments of the present disclosure. The process 900 can be implemented by a computer-implemented system (e.g., the computer-implemented system 100 of FIG. 1, the local computing device 1010 of FIG. 10, and the system 1100 of FIG. 11) at a vehicle (e.g., the AV 502 of FIGS. 5A-5B, 6, and 7A-7D or the AV 1002 of FIG. 10). In certain examples, the process 900 may be implemented by a path multiplexer (e.g., the path multiplexer module 142, the path multiplexer 330, and/or the path multiplexer 440). In general, the process 900 may be performed using any suitable hardware components and/or software components. The process 900 may utilize similar mechanisms discussed above with reference to FIGS. 1-4, 5A-5B, 6, 7A-7D, and 8. Operations are illustrated once each and in a particular order in FIG. 9, but the operations may be performed in parallel, reordered, and/or repeated as desired.

At 902, the computer-implemented system may receive, from a fallback vehicle path planner of a vehicle (e.g., the AVs 502 and/or 1002), data indicative of a fallback path. In some instances, the fallback vehicle path planner may be similar to the fallback planning module 136 and/or the fallback planner 430, and the data indicative of the fallback path may be similar to the data 204 discussed above with reference to FIGS. 1-4.

At 904, the computer-implemented system may store, at a memory of the vehicle, the data indicative of the fallback path.

At 906, the computer-implemented system may receive, from a primary vehicle path planner of the vehicle, data indicative of a primary path. In some instances, the primary vehicle path planner may be similar to the primary planning module 126 and/or the primary planner 420, and the data indicative of the primary path may be similar to the data 206 discussed above. The primary path may be used for controlling the vehicle when the primary vehicle path planner operates under a normal operating condition whereas the fallback path may be used for controlling the vehicle when the primary vehicle path planner operates under a degraded operating condition At 908, the computer-implemented system may receive an event trigger indicative of the degraded operating condition associated with the primary vehicle path planner. In some instances, the event trigger may be similar to the event trigger 208 discussed above.

At 910, the computer-implemented system may select, in response to the event trigger, the fallback path over the primary path.

At 912, the computer-implemented system may send, to a control system (e.g., the control system 150) of the vehicle in response to the selecting, the stored data indicative of the fallback path. For instance, the computer-implemented system may read the stored data indicative of the fallback path and send the read data to the control system.

The fallback path may generally be different from the primary path. In some aspects, the fallback path includes at least one waypoint that is not in the primary path. Further, the at least one waypoint in the fallback path that is not part of the primary path may be associated with stopping the vehicle (e.g., at a comfortable deceleration speed and without causing any collision).

In some aspects, the receiving the data indicative of the fallback path at 902 may be based on a first path update frequency, and the receiving the data indicative of the primary path at 906 may be based on a second path update frequency different from the first path update frequency. In some aspects, the receiving the data indicative of the fallback path at 902 may be based on a first periodic time interval, and the receiving the data indicative of the primary path at 906 may be based on a second periodic time interval offset from the first periodic time interval.

In some aspects, the sending the stored data indicative of the fallback path to the control system at 912 may be based on a duration between a time when the data indicative of the fallback path is received and a time when the event trigger is received being less than a threshold. In some instances, a timer may be user to track an age of each received fallback path, an a stored received fallback path having an age greater than the threshold can be removed from the memory. In other instances, storing the data indicative of the fallback path at the memory may include replacing previous stored fallback path data with the currently received data indicative of the fallback path.

In some aspects, it may be desirable to notify the primary vehicle path planner and the fallback vehicle path planner that the vehicle control has been switched over from the primary vehicle path planner to the fallback vehicle path planner. For instance, the computer-implemented system may further send, to the primary vehicle path planner in response to the event trigger, an indication indicating that the primary vehicle path planner is not in control of the vehicle. Additionally or alternatively, the computer-implemented system may further send, to the fallback vehicle path planner in response to the event trigger, an indication indicating that the fallback vehicle path planner is in control of the vehicle.

In some aspects, it may be desirable to publish information about which of the planners (e.g., the primary vehicle path planner or the fallback vehicle path planner) is (a source planner) in control of the vehicle. For instance, the sending the data indicative of the fallback path at 912 may include sending, to the control system, a message including the data indicative of the fallback path and an indication indicating that a source of the fallback path is the fallback vehicle path planner. Accordingly, a consumer (e.g., the control system) of the path data may be aware of which of the planners is in control and can determine alternative instructions for maneuvering or navigating the vehicle. For example, in some instances, when the fallback vehicle path planner is in control, the control system may select a subset of available actuation operations less than all actuation operations for controlling the vehicle.

In general, a path multiplexer at a vehicle may receive, from a primary planner of the vehicle, updates for a primary plan to control the vehicle. The path multiplexer may receive, from a fallback planner of the vehicle, updates for a fallback plan to control the vehicle. The path multiplexer may store, at a memory of the vehicle, an individual update of the received updates for the fallback plan. The path multiplexer may send, to a control system of the vehicle, data indicative of a primary path based on one or more of the updates for the primary plan (e.g., under a normal operating condition). The path multiplexer may receive an event trigger indicative of a degraded operating condition associated with the primary planner. The path multiplexer may send, to a control system of the vehicle in response to the event trigger, data indicative of a fallback path based on a last known update for the fallback plan stored in the memory.

Turning now to FIG. 10, this figure illustrates an example of an AV management system 1000. One of ordinary skill in the art will understand that, for the AV management system 1000 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1000 includes an AV 1002, a data center 1050, and a client computing device 1070. The AV 1002, the data center 1050, and the client computing device 1070 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 1002 may navigate about roadways without a human driver based on sensor signals generated by multiple sensor systems 1004, 1006, and 1008. The sensor systems 1004-1008 may include different types of sensors and may be arranged about the AV 1002. For instance, the sensor systems 1004-1008 may comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1004 may be a camera system, the sensor system 1006 may be a LIDAR system, and the sensor system 1008 may be a RADAR system. Other embodiments may include any other number and type of sensors.

AV 1002 may also include several mechanical systems that may be used to maneuver or operate AV 1002. For instance, the mechanical systems may include vehicle propulsion system 1030, braking system 1032, steering system 1034, safety system 1036, and cabin system 1038, among other systems. Vehicle propulsion system 1030 may include an electric motor, an internal combustion engine, or both. The braking system 1032 may include an engine brake, a wheel braking system (e.g., a disc braking system that utilizes brake pads), hydraulics, actuators, and/or any other suitable componentry configured to assist in decelerating AV 1002. The steering system 1034 may include suitable componentry configured to control the direction of movement of the AV 1002 during navigation. Safety system 1036 may include lights and signal indicators, a parking brake, airbags, and so forth. The cabin system 1038 may include cabin temperature control systems, in-cabin entertainment systems, and so forth. In some embodiments, the AV 1002 may not include human driver actuators (e.g., steering wheel, handbrake, foot brake pedal, foot accelerator pedal, turn signal lever, window wipers, etc.) for controlling the AV 1002. Instead, the cabin system 1038 may include one or more client interfaces (e.g., Graphical User Interfaces (GUIs), Voice User Interfaces (VUIs), etc.) for controlling certain aspects of the mechanical systems 1030-1038.

AV 1002 may additionally include a local computing device 1010 that is in communication with the sensor systems 1004-1008, the mechanical systems 1030-1038, the data center 1050, and the client computing device 1070, among other systems. The local computing device 1010 may include one or more processors and memory, including instructions that may be executed by the one or more processors. The instructions may make up one or more software stacks or components responsible for controlling the AV 1002; communicating with the data center 1050, the client computing device 1070, and other systems; receiving inputs from riders, passengers, and other entities within the AV's environment; logging metrics collected by the sensor systems 1004-1008; and so forth. In this example, the local computing device 1010 includes a perception stack 1012, a mapping and localization stack 1014, a planning stack 1016, a control stack 1018, a communications stack 1020, a High Definition (HD) geospatial database 1022, and an AV operational database 1024, among other stacks and systems.

Perception stack 1012 may enable the AV 1002 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1004-1008, the mapping and localization stack 1014, the HD geospatial database 1022, other components of the AV, and other data sources (e.g., the data center 1050, the client computing device 1070, third-party data sources, etc.). The perception stack 1012 may detect and classify objects and determine their current and predicted locations, speeds, directions, and the like. In addition, the perception stack 1012 may determine the free space around the AV 1002 (e.g., to maintain a safe distance from other objects, change lanes, park the AV, etc.). The perception stack 1012 may also identify environmental uncertainties, such as where to look for moving objects, flag areas that may be obscured or blocked from view, and so forth.

Mapping and localization stack 1014 may determine the AV's position and orientation (pose) using different methods from multiple systems (e.g., GPS, IMUs, cameras, LIDAR, RADAR, ultrasonic sensors, the HD geospatial database 1022, etc.). For example, in some embodiments, the AV 1002 may compare sensor data captured in real-time by the sensor systems 1004-1008 to data in the HD geospatial database 1022 to determine its precise (e.g., accurate to the order of a few centimeters or less) position and orientation. The AV 1002 may focus its search based on sensor data from one or more first sensor systems (e.g., GPS) by matching sensor data from one or more second sensor systems (e.g., LIDAR). If the mapping and localization information from one system is unavailable, the AV 1002 may use mapping and localization information from a redundant system and/or from remote data sources.

The planning stack 1016 may determine how to maneuver or operate the AV 1002 safely and efficiently in its environment. For example, the planning stack 1016 may receive the location, speed, and direction of the AV 1002, geospatial data, data regarding objects sharing the road with the AV 1002 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 1002 from one point to another. The planning stack 1016 may determine multiple sets of one or more mechanical operations that the AV 1002 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 1016 may select from multiple backup plans to carry out. For example, while preparing to change lanes to turn right at an intersection, another vehicle may aggressively cut into the destination lane, making the lane change unsafe. The planning stack 1016 could have already determined an alternative plan for such an event, and upon its occurrence, help to direct the AV 1002 to go around the block instead of blocking a current lane while waiting for an opening to change lanes.

The control stack 1018 may manage the operation of the vehicle propulsion system 1030, the braking system 1032, the steering system 1034, the safety system 1036, and the cabin system 1038. The control stack 1018 may receive sensor signals from the sensor systems 1004-1008 as well as communicate with other stacks or components of the local computing device 1010 or a remote system (e.g., the data center 1050) to effectuate operation of the AV 1002. For example, the control stack 1018 may implement the final path or actions from the multiple paths or actions provided by the planning stack 1016. Implementation may involve turning the routes and decisions from the planning stack 1016 into commands for the actuators that control the AV's steering, throttle, brake, and drive unit.

In some embodiments, the local computing device 1010 may include multiple computing stacks 1011 (shown as 1011a, 1011b), where each computing stack 1011 may include a respective perception stack 1012 and a respective planning stack 1016. For example, the multiple computing stacks 1011 may include a primary compute stack similar to the primary compute stack 120 and/or 310 and a fallback compute stack similar to the fallback compute stack 120 and/or 320 discussed above. In some embodiments, a computing stack 1011 corresponding to a fallback compute stack may also include a fallback planning planner as discussed above. Further, the local computing device 1010 may include a common stack 1019 (e.g., including a fallback manager and a path multiplexer) similar to the common stack 140 to monitor for a degraded operating condition at the vehicle (e.g., related to primary planning) and select between a primary path calculated by the primary compute stack and a fallback path calculated by the fallback compute stack depending on the monitoring as discussed herein.

The communication stack 1020 may transmit and receive signals between the various stacks and other components of the AV 1002 and between the AV 1002, the data center 1050, the client computing device 1070, and other remote systems. The communication stack 1020 may enable the local computing device 1010 to exchange information remotely over a network, such as through an antenna array or interface that may provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 1020 may also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.).

The HD geospatial database 1022 may store HD maps and related data of the streets upon which the AV 1002 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer may include geospatial information of traffic signal lights, traffic signs, and other road objects and related attributes.

The AV operational database 1024 may store raw AV data generated by the sensor systems 1004-1008 and other components of the AV 1002 and/or data received by the AV 1002 from remote systems (e.g., the data center 1050, the client computing device 1070, etc.). In some embodiments, the raw AV data may include HD LIDAR point cloud data, image or video data, RADAR data, GPS data, and other sensor data that the data center 1050 may use for creating or updating AV geospatial data as discussed further below with respect to FIG. 5 and elsewhere in the present disclosure.

The data center 1050 may be a private cloud (e.g., an enterprise network, a co-location provider network, etc.), a public cloud (e.g., an IaaS network, a PaaS network, a SaaS network, or other Cloud Service Provider (CSP) network), a hybrid cloud, a multi-cloud, and so forth. The data center 1050 may include one or more computing devices remote to the local computing device 1010 for managing a fleet of AVs and AV-related services. For example, in addition to managing the AV 1002, the data center 1050 may also support a ridesharing service, a delivery service, a remote/roadside assistance service, street services (e.g., street mapping, street patrol, street cleaning, street metering, parking reservation, etc.), and the like.

The data center 1050 may send and receive various signals to and from the AV 1002 and the client computing device 1070. These signals may include sensor data captured by the sensor systems 1004-1008, roadside assistance requests, software updates, ridesharing pick-up and drop-off instructions, and so forth. In this example, the data center 1050 includes one or more of a data management platform 1052, an Artificial Intelligence/Machine Learning (AI/ML) platform 1054, a simulation platform 1056, a remote assistance platform 1058, a ridesharing platform 1060, and a map management platform 1062, among other systems.

Data management platform 1052 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 1050 may access data stored by the data management platform 1052 to provide their respective services.

The AI/ML platform 1054 may provide the infrastructure for training and evaluating machine learning algorithms for operating the AV 1002, the simulation platform 1056, the remote assistance platform 1058, the ridesharing platform 1060, the map management platform 1062, and other platforms and systems. Using the AI/ML platform 1054, data scientists may prepare data sets from the data management platform 1052; select, design, and train machine learning models; evaluate, refine, and deploy the models; maintain, monitor, and retrain the models; and so on.

The simulation platform 1056 may enable testing and validation of the algorithms, machine learning models, neural networks, and other development efforts for the AV 1002, the remote assistance platform 1058, the ridesharing platform 1060, the map management platform 1062, and other platforms and systems. The simulation platform 1056 may replicate a variety of driving environments and/or reproduce real-world scenarios from data captured by the AV 1002, including rendering geospatial information and road infrastructure (e.g., streets, lanes, crosswalks, traffic lights, stop signs, etc.) obtained from the map management platform 1062; modeling the behavior of other vehicles, bicycles, pedestrians, and other dynamic elements; simulating inclement weather conditions, different traffic scenarios; and so on.

The remote assistance platform 1058 may generate and transmit instructions regarding the operation of the AV 1002. For example, in response to an output of the AI/ML platform 1054 or other system of the data center 1050, the remote assistance platform 1058 may prepare instructions for one or more stacks or other components of the AV 1002.

The ridesharing platform 1060 may interact with a customer of a ridesharing service via a ridesharing application 1072 executing on the client computing device 1070. The client computing device 1070 may be any type of computing system, including a server, desktop computer, laptop, tablet, smartphone, smart wearable device (e.g., smart watch; smart eyeglasses or other Head-Mounted Display (HMD); smart car pods or other smart in-car, on-ear, or over-ear device; etc.), gaming system, or other general purpose computing device for accessing the ridesharing application 1072. The client computing device 1070 may be a customer's mobile computing device or a computing device integrated with the AV 1002 (e.g., the local computing device 1010). The ridesharing platform 1060 may receive requests to be picked up or dropped off from the ridesharing application 1072 and dispatch the AV 1002 for the trip.

Map management platform 1062 may provide a set of tools for the manipulation and management of geographic and spatial (geospatial) and related attribute data. The data management platform 1052 may receive LIDAR point cloud data, image data (e.g., still image, video, etc.), RADAR data, GPS data, and other sensor data (e.g., raw data) from one or more AVs 1002, Unmanned Aerial Vehicles (UAVs), satellites, third-party mapping services, and other sources of geospatially referenced data. The raw data may be processed, and map management platform 1062 may render base representations (e.g., tiles (2D), bounding volumes (3D), etc.) of the AV geospatial data to enable users to view, query, label, edit, and otherwise interact with the data. Map management platform 1062 may manage workflows and tasks for operating on the AV geospatial data. Map management platform 1062 may control access to the AV geospatial data, including granting or limiting access to the AV geospatial data based on user-based, role-based, group-based, task-based, and other attribute-based access control mechanisms. Map management platform 1062 may provide version control for the AV geospatial data, such as to track specific changes that (human or machine) map editors have made to the data and to revert changes when necessary. Map management platform 1062 may administer release management of the AV geospatial data, including distributing suitable iterations of the data to different users, computing devices, AVs, and other consumers of HD maps. Map management platform 1062 may provide analytics regarding the AV geospatial data and related data, such as to generate insights relating to the throughput and quality of mapping tasks.

In some embodiments, the map viewing services of map management platform 1062 may be modularized and deployed as part of one or more of the platforms and systems of the data center 1050. For example, the AI/ML platform 1054 may incorporate the map viewing services for visualizing the effectiveness of various object detection or object classification models, the simulation platform 1056 may incorporate the map viewing services for recreating and visualizing certain driving scenarios, the remote assistance platform 1058 may incorporate the map viewing services for replaying traffic incidents to facilitate and coordinate aid, the ridesharing platform 1060 may incorporate the map viewing services into the client application 1072 to enable passengers to view the AV 1002 in transit en route to a pick-up or drop-off location, and so on.

Figure 11:
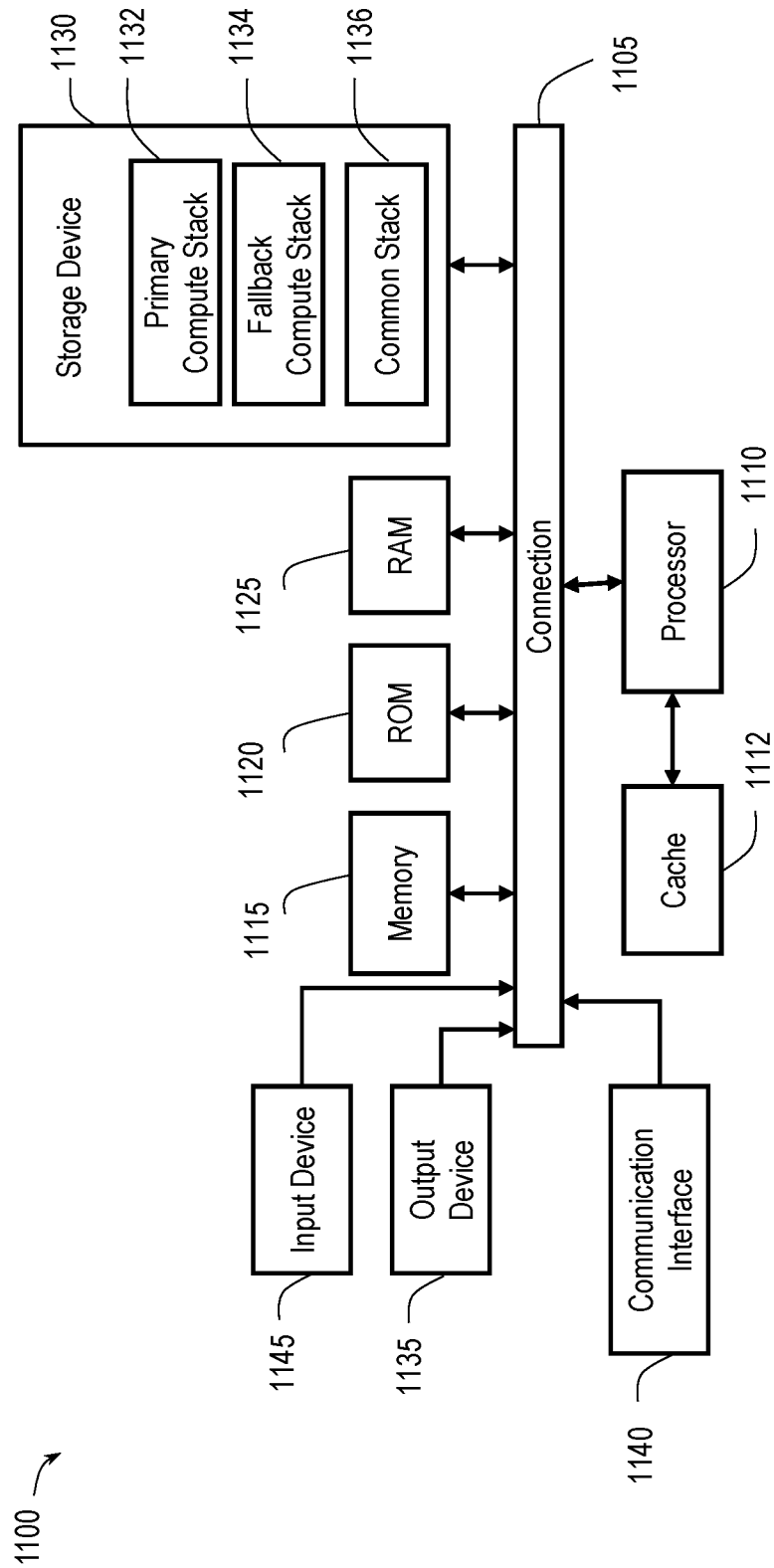
FIG. 11 illustrates an example processor-based system with which some aspects of the subject technology may be implemented.

FIG. 11 illustrates an example processor-based system with which some aspects of the subject technology may be implemented. For example, processor-based system 1100 may be any computing device making up, or any component thereof in which the components of the system are in communication with each other using connection 1105. Connection 1105 may be a physical connection via a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1100 includes at least one processing unit (Central Processing Unit (CPU) or processor) 1110 and connection 1105 that couples various system components including system memory 1115, such as Read-Only Memory (ROM) 1120 and Random-Access Memory (RAM) 1125 to processor 1110. Computing system 1100 may include a cache of high-speed memory 1112 connected directly with, in close proximity to, or integrated as part of processor 1110.

Processor 1110 may include any general-purpose processor and a hardware service or software service, such as a primary compute stack 1132, a fallback compute stack 1134, and a common stack 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms known to those of skill in the art. In some instances, multimodal systems may enable a user to provide multiple types of input/output to communicate with computing system 1100. Computing system 1100 may include communications interface 1140, which may generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Atatic RAM (SRAM), Dynamic RAM (DRAM), ROM, Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 1130 may include software services, servers, services, etc., that when the code that defines such software is executed by the processor 1110, it causes the system 1100 to perform a function. In some embodiments, a hardware service that performs a particular function may include the software component stored in a computer-readable medium in connection with the necessary hardware components, such as processor 1110, connection 1105, output device 1135, etc., to carry out the function.

In some embodiments, the system 1100 may be part of a vehicle (e.g., the AV 1002 or the AVs 502 discussed above), and the storage device 1130 may store instruction codes for the primary compute stack 1132, the fallback compute stack 1134, and the common stack 1136 similar to the primary compute stack 120 and/or 310, the fallback compute stack 130 and/or 320, respectively, for controlling the vehicle as discussed above. For instance, the primary compute stack 1132 may determine a primary plan (e.g., a primary path) and the send the primary plan to the common stack 1136. The fallback compute stack 1134 may determine a fallback plan (e.g., a fallback path) and send the fallback plan to the common stack 1136. The common stack 1136 may send, to a control system of the vehicle, data (instructions) indicating of a primary path based on the received primary plan. The common stack 1136 may store the fallback plan to a memory (e.g., the memory 1115, RAM 1125, cache 1112) of the system 1100. The common stack 1136 may receive an event trigger indicating that the primary compute stack 1132 cannot provide a valid path for the vehicle. In response to the event trigger, the common stack 1136 may send, to the control system, data (instructions) indicative of a last known fallback path based on the stored fallback plan Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a computer-implemented method including receiving, from a fallback vehicle path planner of a vehicle, data indicative of a fallback path; storing, at a memory of the vehicle, the data indicative of the fallback path; receiving, from a primary vehicle path planner of the vehicle, data indicative of a primary path, where the primary path is for use by the vehicle when the primary vehicle path planner is in a normal operating condition, and where the fallback path is for use by the vehicle when the primary vehicle path planner is in a degraded operating condition; receiving an event trigger indicative of a degraded operating condition associated with the primary vehicle path planner; selecting, in response to the event trigger, the fallback path over the primary path; and sending, based on the selecting to a control system of the vehicle, the stored data indicative of the fallback path.

In Example 2, the computer-implemented method of example 1 can optionally include where the fallback path includes at least one waypoint that is not in the primary path.

In Example 3, the computer-implemented method of any one of examples 1-2 can optionally include where the at least one waypoint in the fallback path is associated with stopping the vehicle.

In Example 4, the computer-implemented method of any one of examples 1-3 can optionally include where the receiving the data indicative of the fallback path is based on a first path update frequency; and the receiving the data indicative of the primary path is based on a second path update frequency different from the first path update frequency.

In Example 5, the computer-implemented method of any one of examples 1~4 can optionally include where the receiving the data indicative of the fallback path is based on a first periodic time interval; and the receiving the data indicative of the primary path is based on a second periodic time interval offset from the first periodic time interval.

In Example 6, the computer-implemented method of any one of examples 1-5 can optionally include where the sending, to the control system, the stored data indicative of the fallback path is based on a duration between a time when the data indicative of the fallback path is received and a time when the event trigger is received being less than a threshold.

In Example 7, the computer-implemented method of any one of examples 1-6 can optionally include updating a state variable from a first state to a second state responsive to the event trigger; receiving, from the fallback vehicle path planner, data indicative of a second fallback path; and sending, to the control system, the data indicative of the second fallback path based on the state variable being updated to the second state.

In Example 8, the computer-implemented method of any one of examples 1-7 can optionally include sending, to the primary vehicle path planner in response to the event trigger, an indication indicating that the primary vehicle path planner is not in control of the vehicle.

In Example 9, the computer-implemented method of any one of examples 1-8 can optionally include sending, to the fallback vehicle path planner in response to the event trigger, an indication indicating that the fallback vehicle path planner is in control of the vehicle.

In Example 10, the computer-implemented method of any one of examples 1-9 can optionally include where the sending the data indicative of the fallback path includes sending, to the control system, a message including the data indicative of the fallback path and an indication indicating that a source of the fallback path is the fallback vehicle path planner.

In Example 11, the computer-implemented method of any one of examples 1-10 can optionally include receiving, from the primary vehicle path planner, data indicative of a second primary path; and sending, to the control system, a message including the data indicative of the second primary path and an indication indicating that a source of the second primary path is the primary vehicle path planner.

Example 12 includes a computer-implemented system at a vehicle, the computer-implemented system including a memory including instructions; one or more processing units to execute the instructions; a path multiplexer, encoded in the instructions, to receive, from a fallback planner of the vehicle, data indicative of a fallback path; store, in the memory, the data indicative of the fallback path; receive, from a primary planner of the vehicle, data indicative of a primary path; receive, from a fallback manager of the vehicle, a first event trigger indicative of a degraded operating condition associated with the primary planner; select, in response to the first event trigger, the fallback path over the primary path; and transmit, to a control system of the vehicle in response to the selecting, the stored data indicative of the fallback path.

In Example 13, the computer-implemented system of example 12 can optionally include the fallback manager, encoded in the instructions, to monitor for the degraded operating condition; and in response to a detection of the degraded operating condition transmit, to the path multiplexer, the first event trigger; and transmit, to the fallback planner, a second event trigger indicative of the degraded operating condition associated with the primary planner.

In Example 14, the computer-implemented system of any one of examples 12-13 can optionally include where the fallback manager performs the monitoring at a faster frequency than at least one of a primary path update frequency associated with the primary planner or a fallback path update frequency associated with the fallback planner.

In Example 15, the computer-implemented system of any one of examples 12-14 can optionally include where the fallback manager further sends an indication of a further degraded state of operation based on a failure associated with the fallback planner.

In Example 16, the computer-implemented system of any one of examples 12-15 can optionally include where the path multiplexer performs the selecting at a faster frequency than at least one of a primary path update frequency associated with the primary planner or a fallback path update frequency associated with the fallback planner.

In Example 17, the computer-implemented system of any one of examples 12-16 can optionally include where the path multiplexer further receives the data indicative of the primary path based on a first path update frequency; and receives the data indicative of the fallback path based on a second path update frequency different than the first path update frequency.

In Example 18, the computer-implemented system of any one of examples 12-17 can optionally include where the path multiplexer further receives the data indicative of the primary path based on a first repeating time interval; and receives the data indicative of the fallback path based on a second repeating time interval offset from the first repeating time interval.

In Example 19, the computer-implemented system of any one of examples 12-18 can optionally include where the path multiplexer further sends, to the primary planner in response to the first event trigger, an indication indicating that the primary planner is not in control of the vehicle; and sends, to the fallback planner in response to the first event trigger, an indication indicating that the fallback planner is in control of the vehicle.

In Example 20, the computer-implemented system of any one of examples 12-19 can optionally include the fallback planner, encoded in the instructions, to calculate, using a last calculated position of the vehicle, a second fallback path for the vehicle in response to the indication indicating that the fallback planner is in control of the vehicle; and calculate, using a current position of the vehicle, a third fallback path for the vehicle in response to an absence of the indication indicating that the fallback planner is in control of the vehicle.

In Example 21, the computer-implemented system of any one of examples 12-20 can optionally include the primary planner, encoded in the instructions, to calculate, using a current position of the vehicle, a second primary path for the vehicle in response to the indication indicating that the primary planner is not in control of the vehicle; and calculate, using a last calculated position of the vehicle, a third primary path for the vehicle in response to an absence of the indication indicating that the primary planner is not in control of the vehicle.

Example 22 includes one or more non-transitory, computer-readable media encoded with instructions that, when executed by one or more processing units, cause the one or more processing units to perform operations including receiving, from a primary planner of a vehicle, updates for a primary plan to control the vehicle; receiving, from a fallback planner of the vehicle, updates for a fallback plan to control the vehicle; storing, at a memory of the vehicle, an individual update of the received updates for the fallback plan; sending, to a control system of the vehicle, data indicative of a primary path based on one or more of the updates for the primary plan; receiving an event trigger indicative of a degraded operating condition associated with the primary planner; and sending, to a control system of the vehicle in response to the event trigger, data indicative of a fallback path based on a last known update for the fallback plan stored in the memory.

In Example 23, the one or more non-transitory, computer-readable media of example 22 can optionally include where the receiving the updates for the primary plan is based on a first path update frequency; and the receiving the updates for the fallback plan is based on a second path update frequency independent of the first path update frequency.

In Example 24, the one or more non-transitory, computer-readable media of any one of examples 22-23 can optionally include where the operations further include sending, to the primary planner in response to the event trigger, an indication indicating that the primary planner is not in control of the vehicle.

In Example 25, the one or more non-transitory, computer-readable media of any one of examples 22-24 can optionally include where the operations further include sending, to the fallback planner in response to the event trigger, an indication indicating that the fallback planner is in control of the vehicle.

In Example 26, the one or more non-transitory, computer-readable media of any one of examples 22-25 can optionally include where the sending the data indicative of the fallback path includes sending, to the control system, a message including the data indicative of the fallback path; and an indication indicating that a source of the fallback path is the fallback planner.

In Example 27, the one or more non-transitory, computer-readable media of any one of examples 22-26 can optionally include where the sending the data indicative of the primary path includes sending, to the control system, a message including the data indicative of the primary path; and an indication indicating that a source of the primary path is the primary planner.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The invention claimed is:

1. A computer-implemented method comprising:
  receiving, from a fallback vehicle path planner of a vehicle, data indicative of a fallback path;
  storing, at a memory of the vehicle, the data indicative of the fallback path;
  receiving, from a primary vehicle path planner of the vehicle, data indicative of a primary path, wherein the primary path is for use by the vehicle when the primary vehicle path planner is in a normal operating condition, and wherein the fallback path is for use by the vehicle when the primary vehicle path planner is in a degraded operating condition;
  receiving an event trigger indicative of the degraded operating condition associated with the primary vehicle path planner;
  selecting, in response to the event trigger, the fallback path over the primary path; and
  sending, to a control system of the vehicle in response to the selecting, the stored data indicative of the fallback path.

2. The computer-implemented method of claim 1, wherein the fallback path includes at least one waypoint that is not in the primary path.

3. The computer-implemented method of claim 2, wherein the at least one waypoint in the fallback path is associated with stopping the vehicle.

4. The computer-implemented method of claim 1, wherein:
  the receiving the data indicative of the fallback path is based on a first path update frequency; and
  the receiving the data indicative of the primary path is based on a second path update frequency different from the first path update frequency.

5. The computer-implemented method of claim 1, wherein:

the receiving the data indicative of the fallback path is based on a first periodic time interval; and the receiving the data indicative of the primary path is based on a second periodic time interval offset from the first periodic time interval.

6. The computer-implemented method of claim 1, wherein the sending, to the control system, the stored data indicative of the fallback path is based on a duration between a time when the data indicative of the fallback path is received and a time when the event trigger is received is less than a threshold.

7. The computer-implemented method of claim 1, further comprising:
sending, to the primary vehicle path planner in response to the event trigger, an indication indicating that the primary vehicle path planner is not in control of the vehicle.

8. The computer-implemented method of claim 1, further comprising:
sending, to the fallback vehicle path planner in response to the event trigger, an indication indicating that the fallback vehicle path planner is in control of the vehicle.

9. The computer-implemented method of claim 1, wherein the sending the data indicative of the fallback path comprises:
sending, to the control system, a message including the data indicative of the fallback path and an indication indicating that a source of the fallback path is the fallback vehicle path planner.

10. A computer-implemented system at a vehicle, the computer-implemented system comprising:
a memory including instructions;
one or more processing units to execute the instructions; and
a path multiplexer, encoded in the instructions, to:
receive, from a fallback planner of the vehicle, data indicative of a fallback path;
store, in the memory, the data indicative of the fallback path;
receive, from a primary planner of the vehicle, data indicative of a primary path;
receive, from a fallback manager of the vehicle, a first event trigger indicative of a degraded operating condition associated with the primary planner;
select, in response to the first event trigger, the fallback path over the primary path; and
transmit, to a control system of the vehicle in response to the selecting, the stored data indicative of the fallback path.

11. The computer-implemented system of claim 10, further comprising:
the fallback manager, encoded in the instructions, to:
monitor for the degraded operating condition; and
in response to a detection of the degraded operating condition:
transmit, to the path multiplexer, the first event trigger; and
transmit, to the fallback planner, a second event trigger indicative of the degraded operating condition associated with the primary planner.

12. The computer-implemented system of claim 11, wherein the fallback manager performs the monitoring at a faster frequency than at least one of an update frequency of the primary planner or an update frequency of the fallback planner.

13. The computer-implemented system of claim 11, wherein the fallback manager further sends an indication of a further degraded state of operation based on a failure associated with the fallback planner.

14. The computer-implemented system of claim 10, wherein the path multiplexer performs the selecting at a faster frequency than at least one of an update frequency of the primary planner or an update frequency of the fallback planner.

15. The computer-implemented system of claim 10, wherein:
the path multiplexer further sends, to the fallback planner in response to the first event trigger, an indication indicating that the fallback planner is in control of the vehicle; and
the computer-implemented system further comprises:
the fallback planner, encoded in the instructions, to:
calculate, using a current position of the vehicle, a second fallback path for the vehicle in response to the indication indicating that the fallback planner is in control of the vehicle; and
calculate, using a last calculated position of the vehicle, a third fallback path for the vehicle in response to an absence of the indication indicating that the fallback planner is in control of the vehicle.

16. One or more non-transitory, computer-readable media encoded with instructions that, when executed by one or more processing units, cause the one or more processing units to perform operations comprising:
receiving, from a primary planner of a vehicle, updates for a primary plan to control the vehicle;
receiving, from a fallback planner of the vehicle, updates for a fallback plan to control the vehicle;
storing, at a memory of the vehicle, an individual update of the received updates for the fallback plan;
sending, to a control system of the vehicle, data indicative of a primary path based on one or more of the updates for the primary plan;
receiving an event trigger indicative of a degraded operating condition associated with the primary planner; and
sending, to a control system of the vehicle in response to the event trigger, data indicative of a fallback path based on a last known update for the fallback plan stored in the memory.

17. The one or more non-transitory, computer-readable media of claim 16, wherein the operations further comprise:
sending, to the primary planner in response to the event trigger, an indication indicating that the primary planner is not in control of the vehicle.

18. The one or more non-transitory, computer-readable media of claim 16, wherein the operations further comprise:
sending, to the fallback planner in response to the event trigger, an indication indicating that the fallback planner is in control of the vehicle.

19. The one or more non-transitory, computer-readable media of claim 16, wherein the sending the data indicative of the fallback path comprises:
sending, to the control system, a message including:
the data indicative of the fallback path; and
an indication indicating that a source of the fallback path is the fallback planner.

20. The one or more non-transitory, computer-readable media of claim 16, wherein the sending the data indicative of the primary path comprises:
sending, to the control system, a message including:

the data indicative of the primary path; and
an indication indicating that a source of the primary path is the primary planner.

\* \* \* \* \*